United States Patent

Hohmann, Jr.

(10) Patent No.: US 9,758,958 B2
(45) Date of Patent: *Sep. 12, 2017

(54) THERMAL WALL ANCHOR

(71) Applicant: Columbia Insurance Company, Omaha, NE (US)

(72) Inventor: Ronald P. Hohmann, Jr., Hauppauge, NY (US)

(73) Assignee: Columbia Insurance Company, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/860,171

(22) Filed: Sep. 21, 2015

(65) Prior Publication Data

US 2016/0010325 A1    Jan. 14, 2016

Related U.S. Application Data

(63) Continuation of application No. 14/313,689, filed on Jun. 24, 2014, now Pat. No. 9,140,001.

(51) Int. Cl.
*E04B 1/41* (2006.01)
*E04B 1/76* (2006.01)
(Continued)

(52) U.S. Cl.
CPC .......... *E04B 1/4178* (2013.01); *E04B 1/7629* (2013.01); *F16B 25/0031* (2013.01);
(Continued)

(58) Field of Classification Search
CPC ................ E04B 1/4178; E04B 1/7629; E04B 2001/7679; F16B 25/0031; F16B 25/103; F16B 45/00
(Continued)

(56) References Cited

U.S. PATENT DOCUMENTS 819,869 A     5/1906   Denlap
903,000 A    11/1908   Priest
(Continued)

FOREIGN PATENT DOCUMENTS

CH    279209         3/1952
EP    0 199 595 B1   3/1995
(Continued)

OTHER PUBLICATIONS

ASTM Standard E754-80 (2006), Standard Test Method for Pullout Resistance of Ties and Anchors Embedded in Masonry Mortar Joints, ASTM International, 8 pages, West Conshohocken, Pennsylvania, United States.

(Continued)

*Primary Examiner* — Brent W Herring
(74) *Attorney, Agent, or Firm* — Senniger Powers LLP

(57) ABSTRACT

A wall anchor for use in a cavity wall includes an elongate body having a driven end portion and a driving end portion. The driven end portion is adapted to be threadedly mounted on the inner wythe of the cavity wall. The elongate body includes a barrel portion adjacent the driven end portion. A first end of the barrel portion is adapted to abut the inner wythe of the cavity wall when installed. A thermal coating is disposed on the first end of the barrel portion. The thermal coating is configured and arranged to reduce thermal transfer in the cavity wall between the elongate body and the inner wythe when installed.

20 Claims, 19 Drawing Sheets

(51) Int. Cl.
*F16B 25/00* (2006.01)
*F16B 25/10* (2006.01)
*F16B 45/00* (2006.01)

(52) U.S. Cl.
CPC .... *F16B 25/103* (2013.01); *E04B 2001/7679* (2013.01); *F16B 45/00* (2013.01)

(58) Field of Classification Search
USPC .......... 52/379, 378, 408, 513, 712; 411/400, 411/401, 424
See application file for complete search history.

(56) References Cited

U.S. PATENT DOCUMENTS

| | | |
|---|---|---|
| 1,014,157 A | 1/1912 | Lewen |
| 1,170,419 A | 2/1916 | Coon et al. |
| RE15,979 E | 1/1925 | Schaefer et al. |
| 1,794,684 A | 3/1931 | Handel |
| 1,936,223 A | 11/1933 | Awbrey |
| 1,988,124 A | 1/1935 | Johnson |
| 2,058,148 A | 10/1936 | Hard |
| 2,097,821 A | 11/1937 | Mathers |
| 2,280,647 A | 4/1942 | Hawes |
| 2,300,181 A | 10/1942 | Spaight |
| 2,343,764 A | 3/1944 | Fuller |
| 2,403,566 A | 7/1946 | Thorp et al. |
| 2,413,772 A | 1/1947 | Morehouse |
| 2,605,867 A | 8/1952 | Goodwin |
| 2,780,936 A | 2/1957 | Hillberg |
| 2,898,758 A | 8/1959 | Henrickson |
| 2,909,054 A | 10/1959 | Phillips |
| 2,929,238 A | 3/1960 | Kaye |
| 2,966,705 A | 1/1961 | Massey |
| 2,999,571 A | 9/1961 | Huber |
| 3,030,670 A | 4/1962 | Bigelow |
| 3,088,361 A | 5/1963 | Hallock |
| 3,114,220 A | 12/1963 | Maddox et al. |
| 3,121,978 A | 2/1964 | Reiland |
| 3,183,628 A | 5/1965 | Smith |
| 3,254,736 A | 6/1966 | Gass |
| 3,277,626 A | 10/1966 | Brynjolfsson et al. |
| 3,300,939 A | 1/1967 | Brynjolfsson et al. |
| 3,309,828 A | 3/1967 | Tribble |
| 3,310,926 A | 3/1967 | Brandreth et al. |
| 3,341,998 A | 9/1967 | Lucas |
| 3,377,764 A | 4/1968 | Storch |
| 3,440,922 A | 4/1969 | Cohen |
| 3,478,409 A * | 11/1969 | Kline ................. B21J 15/02 156/91 |
| 3,478,480 A | 11/1969 | Swenson |
| 3,529,508 A | 9/1970 | Cooksey |
| 3,563,131 A | 2/1971 | Ridley, Sr. |
| 3,568,389 A | 3/1971 | Gulow |
| 3,640,043 A | 2/1972 | Querfeld et al. |
| 3,803,972 A | 4/1974 | Deutsher |
| 3,897,712 A | 8/1975 | Black |
| 3,911,783 A * | 10/1975 | Gapp ................. F16B 19/06 411/504 |
| 3,925,996 A | 12/1975 | Wiggill |
| 3,964,226 A | 6/1976 | Hala et al. |
| 3,964,227 A | 6/1976 | Hala |
| 4,021,990 A | 5/1977 | Schwalberg |
| 4,227,359 A | 10/1980 | Schlenker |
| 4,238,987 A | 12/1980 | Siebrecht-Reuter |
| 4,281,494 A | 8/1981 | Weinar |
| 4,305,239 A | 12/1981 | Geraghty |
| 4,373,314 A | 2/1983 | Allan |
| 4,382,416 A | 5/1983 | Kellogg-Smith |
| 4,410,760 A | 10/1983 | Cole |
| 4,424,745 A | 1/1984 | Magorian et al. |
| 4,438,611 A | 3/1984 | Bryant |
| 4,460,330 A | 7/1984 | Bettini et al. |
| 4,473,984 A | 10/1984 | Lopez |
| 4,482,368 A | 11/1984 | Roberts |
| 4,571,909 A | 2/1986 | Berghuis et al. |
| 4,596,102 A | 6/1986 | Catani et al. |
| 4,598,518 A | 7/1986 | Hohmann |
| 4,606,163 A | 8/1986 | Catani |
| 4,622,796 A | 11/1986 | Aziz et al. |
| 4,628,657 A | 12/1986 | Ermer et al. |
| 4,636,125 A | 1/1987 | Burgard |
| 4,640,848 A | 2/1987 | Cerdan-Diaz et al. |
| 4,660,342 A | 4/1987 | Salisbury |
| 4,688,363 A | 8/1987 | Sweeney et al. |
| 4,703,604 A | 11/1987 | Muller |
| 4,708,551 A | 11/1987 | Richter et al. |
| 4,714,507 A | 12/1987 | Ohgushi |
| 4,723,866 A | 2/1988 | McCauley |
| 4,738,070 A | 4/1988 | Abbott et al. |
| 4,757,662 A | 7/1988 | Gasser |
| 4,764,069 A | 8/1988 | Reinwall et al. |
| 4,819,401 A | 4/1989 | Whitney, Jr. |
| 4,827,684 A | 5/1989 | Allan |
| 4,830,196 A | 5/1989 | Csanady |
| 4,843,776 A | 7/1989 | Guignard |
| 4,852,320 A | 8/1989 | Ballantyne |
| 4,869,038 A | 9/1989 | Catani |
| 4,869,043 A | 9/1989 | Hatzinikolas et al. |
| 4,875,319 A | 10/1989 | Hohmann |
| 4,887,951 A | 12/1989 | Hashimoto |
| 4,911,949 A | 3/1990 | Iwase et al. |
| 4,922,680 A | 5/1990 | Kramer et al. |
| 4,923,348 A | 5/1990 | Carlozzo et al. |
| 4,946,632 A | 8/1990 | Pollina |
| 4,948,319 A | 8/1990 | Day et al. |
| 4,955,172 A | 9/1990 | Pierson |
| 4,993,902 A | 2/1991 | Hellon |
| 5,063,722 A | 11/1991 | Hohmann |
| 5,099,628 A | 3/1992 | Noland et al. |
| 5,207,043 A | 5/1993 | McGee et al. |
| 5,307,602 A | 5/1994 | Lebraut |
| 5,338,141 A | 8/1994 | Hulsey |
| 5,392,581 A | 2/1995 | Hatzinikolas et al. |
| 5,395,196 A | 3/1995 | Notaro |
| 5,408,798 A | 4/1995 | Hohmann |
| 5,440,854 A | 8/1995 | Hohmann |
| 5,454,200 A | 10/1995 | Hohmann |
| 5,456,052 A | 10/1995 | Anderson et al. |
| 5,490,366 A | 2/1996 | Burns et al. |
| 5,501,306 A * | 3/1996 | Martino ................. F16D 65/12 188/218 XL |
| 5,518,351 A | 5/1996 | Peil |
| 5,598,673 A | 2/1997 | Atkins |
| 5,634,310 A | 6/1997 | Hohmann |
| 5,669,592 A | 9/1997 | Kearful |
| 5,671,578 A | 9/1997 | Hohmann |
| 5,673,527 A | 10/1997 | Coston et al. |
| 5,755,070 A | 5/1998 | Hohmann |
| 5,816,008 A | 10/1998 | Hohmann |
| 5,819,486 A | 10/1998 | Goodings |
| 5,845,455 A | 12/1998 | Johnson, III |
| 6,000,178 A | 12/1999 | Goodings |
| 6,045,022 A | 4/2000 | Giles |
| 6,125,608 A | 10/2000 | Charlson |
| 6,176,662 B1 | 1/2001 | Champney et al. |
| 6,209,281 B1 | 4/2001 | Rice |
| 6,279,283 B1 | 8/2001 | Hohmann et al. |
| 6,284,311 B1 | 9/2001 | Gregorovich et al. |
| 6,293,744 B1 | 9/2001 | Hempfling et al. |
| 6,332,300 B1 | 12/2001 | Wakai |
| 6,351,922 B1 | 3/2002 | Burns et al. |
| 6,367,219 B1 | 4/2002 | Quinlan |
| 6,508,447 B1 | 1/2003 | Catani et al. |
| 6,548,190 B2 | 4/2003 | Spitsberg et al. |
| 6,612,343 B2 | 9/2003 | Camberlin et al. |
| 6,627,128 B1 | 9/2003 | Boyer |
| 6,668,505 B1 | 12/2003 | Hohmann et al. |
| 6,686,301 B2 | 2/2004 | Li et al. |
| 6,709,213 B2 | 3/2004 | Bailey |
| 6,718,774 B2 | 4/2004 | Razzell |
| 6,735,915 B1 | 5/2004 | Johnson, III |
| 6,739,105 B2 | 5/2004 | Fleming |
| 6,789,365 B1 | 9/2004 | Hohmann et al. |

(56) References Cited

U.S. PATENT DOCUMENTS

| | | | |
|---|---|---|---|
| 6,812,276 B2 | 11/2004 | Yeager |
| 6,817,147 B1 | 11/2004 | MacDonald |
| 6,827,969 B1 | 12/2004 | Skoog et al. |
| 6,837,013 B2 | 1/2005 | Foderberg et al. |
| 6,851,239 B1 | 2/2005 | Hohmann et al. |
| 6,918,218 B2 | 7/2005 | Greenway |
| 6,925,768 B2 | 8/2005 | Hohmann et al. |
| 6,941,717 B2 | 9/2005 | Hohmann et al. |
| 6,968,659 B2 | 11/2005 | Boyer |
| 7,007,433 B2 | 3/2006 | Boyer |
| 7,017,318 B1 | 3/2006 | Hohmann et al. |
| 7,043,884 B2 | 5/2006 | Moreno |
| 7,059,577 B1 | 6/2006 | Burgett |
| D527,834 S | 9/2006 | Thimons et al. |
| 7,147,419 B2 | 12/2006 | Balbo Di Vinadio |
| 7,152,382 B2 | 12/2006 | Johnson, III |
| 7,171,788 B2 | 2/2007 | Bronner |
| 7,178,299 B2 | 2/2007 | Hyde et al. |
| D538,948 S | 3/2007 | Thimons et al. |
| 7,225,590 B1 | 6/2007 | diGirolamo et al. |
| 7,325,366 B1 | 2/2008 | Hohmann, Jr. et al. |
| 7,334,374 B2 | 2/2008 | Schmid |
| 7,374,825 B2 | 5/2008 | Hazel et al. |
| 7,415,803 B2 | 8/2008 | Bronner |
| 7,469,511 B2 | 12/2008 | Wobber |
| 7,481,032 B2 | 1/2009 | Tarr |
| 7,552,566 B2 | 6/2009 | Hyde et al. |
| 7,562,506 B2 | 7/2009 | Hohmann, Jr. |
| 7,587,874 B2 | 9/2009 | Hohmann, Jr. |
| 7,654,057 B2 | 2/2010 | Zambelli et al. |
| 7,735,292 B2 | 6/2010 | Massie |
| 7,744,321 B2 | 6/2010 | Wells |
| 7,748,181 B1 | 7/2010 | Guinn |
| 7,788,869 B2 | 9/2010 | Voegele, Jr. |
| D626,817 S | 11/2010 | Donowho et al. |
| 7,845,137 B2 | 12/2010 | Hohmann, Jr. |
| 7,918,634 B2 | 4/2011 | Conrad et al. |
| 8,029,223 B2 | 10/2011 | Mair |
| 8,037,653 B2 | 10/2011 | Hohmann, Jr. |
| 8,051,619 B2 | 11/2011 | Hohmann, Jr. |
| 8,092,134 B2 | 1/2012 | Oguri et al. |
| 8,096,090 B1 | 1/2012 | Hohmann, Jr. et al. |
| 8,109,706 B2 | 2/2012 | Richards |
| 8,122,663 B1 | 2/2012 | Hohmann, Jr. et al. |
| 8,154,859 B2 | 4/2012 | Shahrokhi |
| 8,201,374 B2 | 6/2012 | Hohmann, Jr. |
| 8,209,934 B2 | 7/2012 | Pettingale |
| 8,215,083 B2 | 7/2012 | Toas et al. |
| 8,291,672 B2 | 10/2012 | Hohmann, Jr. et al. |
| 8,347,581 B2 | 1/2013 | Doerr et al. |
| 8,375,667 B2 | 2/2013 | Hohmann, Jr. |
| 8,418,422 B2 | 4/2013 | Johnson, III |
| 8,511,041 B2 | 8/2013 | Fransen |
| 8,516,763 B2 | 8/2013 | Hohmann, Jr. |
| 8,516,768 B2 | 8/2013 | Johnson, III |
| 8,544,228 B2 | 10/2013 | Bronner |
| 8,555,587 B2 | 10/2013 | Hohmann, Jr. |
| 8,555,596 B2 | 10/2013 | Hohmann, Jr. |
| 8,596,010 B2 | 12/2013 | Hohmann, Jr. |
| 8,609,224 B2 | 12/2013 | Li et al. |
| 8,613,175 B2 | 12/2013 | Hohmann, Jr. |
| 8,635,832 B2 | 1/2014 | Heudorfer et al. |
| 8,661,766 B2 | 3/2014 | Hohmann, Jr. |
| 8,667,757 B1 | 3/2014 | Hohmann, Jr. |
| 8,726,596 B2 | 5/2014 | Hohmann, Jr. |
| 8,726,597 B2 | 5/2014 | Hohmann, Jr. |
| 8,733,049 B2 | 5/2014 | Hohmann, Jr. |
| 8,739,485 B2 | 6/2014 | Hohmann, Jr. |
| 8,800,241 B2 | 8/2014 | Hohmann, Jr. |
| 8,833,003 B1 | 9/2014 | Hohmann, Jr. |
| 8,839,581 B2 | 9/2014 | Hohmann, Jr. |
| 8,839,587 B2 | 9/2014 | Hohmann, Jr. |
| 8,844,229 B1 | 9/2014 | Hohmann, Jr. |
| 8,863,460 B2 | 10/2014 | Hohmann, Jr. |
| 8,881,488 B2 | 11/2014 | Hohmann, Jr. et al. |
| 8,898,980 B2 | 12/2014 | Hohmann, Jr. |
| 8,904,726 B1 | 12/2014 | Hohmann, Jr. |
| 8,904,727 B1 | 12/2014 | Hohmann, Jr. |
| 8,904,730 B2 | 12/2014 | Hohmann, Jr. |
| 8,904,731 B2 | 12/2014 | Hohmann, Jr. et al. |
| 8,910,445 B2 | 12/2014 | Hohmann, Jr. |
| 8,920,092 B2 | 12/2014 | D'Addario et al. |
| 8,984,837 B2 | 3/2015 | Curtis et al. |
| 2001/0054270 A1 | 12/2001 | Rice |
| 2002/0047488 A1 | 4/2002 | Webb et al. |
| 2002/0100239 A1 | 8/2002 | Lopez |
| 2003/0121226 A1 | 7/2003 | Bolduc |
| 2003/0217521 A1 | 11/2003 | Richardson et al. |
| 2004/0050807 A1 | 3/2004 | Cheng |
| 2004/0083667 A1 | 5/2004 | Johnson, III |
| 2004/0187421 A1 | 9/2004 | Johnson, III |
| 2004/0216408 A1 | 11/2004 | Hohmann, Jr. |
| 2004/0216413 A1 | 11/2004 | Hohmann et al. |
| 2004/0216416 A1 | 11/2004 | Hohmann et al. |
| 2004/0231270 A1 | 11/2004 | Collins et al. |
| 2005/0046187 A1 | 3/2005 | Takeuchi et al. |
| 2005/0129485 A1 | 6/2005 | Swim, Jr. |
| 2005/0279042 A1 | 12/2005 | Bronner |
| 2005/0279043 A1 | 12/2005 | Bronner |
| 2006/0005490 A1 | 1/2006 | Hohmann, Jr. |
| 2006/0198717 A1 | 9/2006 | Fuest |
| 2006/0242921 A1 | 11/2006 | Massie |
| 2006/0251916 A1 | 11/2006 | Arikawa et al. |
| 2007/0011964 A1 | 1/2007 | Smith |
| 2007/0059121 A1 | 3/2007 | Chien |
| 2008/0092472 A1 | 4/2008 | Doerr et al. |
| 2008/0141605 A1 | 6/2008 | Hohmann |
| 2008/0166203 A1 | 7/2008 | Reynolds et al. |
| 2008/0222992 A1 | 9/2008 | Hikai et al. |
| 2009/0133351 A1 | 5/2009 | Wobber |
| 2009/0133357 A1 | 5/2009 | Richards |
| 2009/0173828 A1 | 7/2009 | Oguri et al. |
| 2010/0037552 A1 | 2/2010 | Bronner |
| 2010/0071307 A1 | 3/2010 | Hohmann, Jr. |
| 2010/0101175 A1 | 4/2010 | Hohmann |
| 2010/0192495 A1 | 8/2010 | Huff et al. |
| 2010/0257803 A1 | 10/2010 | Hohmann, Jr. |
| 2011/0041442 A1 | 2/2011 | Bui |
| 2011/0047919 A1 | 3/2011 | Hohmann, Jr. |
| 2011/0061333 A1 | 3/2011 | Bronner |
| 2011/0083389 A1 | 4/2011 | Bui |
| 2011/0146195 A1 | 6/2011 | Hohmann, Jr. |
| 2011/0164943 A1* | 7/2011 | Conrad .......... F16B 33/06 411/392 |
| 2011/0173902 A1 | 7/2011 | Hohmann, Jr. et al. |
| 2011/0189480 A1 | 8/2011 | Hung |
| 2011/0277397 A1 | 11/2011 | Hohmann, Jr. |
| 2012/0186183 A1 | 7/2012 | Johnson, III |
| 2012/0285111 A1 | 11/2012 | Johnson, III |
| 2012/0304576 A1 | 12/2012 | Hohmann, Jr. |
| 2012/0308330 A1 | 12/2012 | Hohmann, Jr. |
| 2013/0008121 A1 | 1/2013 | Dalen |
| 2013/0074435 A1 | 3/2013 | Hohmann, Jr. |
| 2013/0074442 A1 | 3/2013 | Hohmann, Jr. |
| 2013/0232893 A1 | 9/2013 | Hohmann, Jr. |
| 2013/0232909 A1 | 9/2013 | Curtis et al. |
| 2013/0247482 A1 | 9/2013 | Hohmann, Jr. |
| 2013/0247483 A1 | 9/2013 | Hohmann, Jr. |
| 2013/0247484 A1 | 9/2013 | Hohmann, Jr. |
| 2013/0247498 A1 | 9/2013 | Hohmann, Jr. |
| 2013/0340378 A1 | 12/2013 | Hohmann, Jr. |
| 2014/0000211 A1 | 1/2014 | Hohmann, Jr. |
| 2014/0075855 A1 | 3/2014 | Hohmann, Jr. |
| 2014/0075856 A1 | 3/2014 | Hohmann, Jr. |
| 2014/0075879 A1 | 3/2014 | Hohmann, Jr. |
| 2014/0096466 A1 | 4/2014 | Hohmann, Jr. |
| 2014/0174013 A1 | 6/2014 | Hohmann, Jr. et al. |
| 2014/0202098 A1 | 7/2014 | De Smet et al. |
| 2014/0215958 A1 | 8/2014 | Duyvejonck et al. |
| 2014/0250826 A1 | 9/2014 | Hohmann, Jr. |
| 2015/0033651 A1 | 2/2015 | Hohmann, Jr. |

(56) References Cited

U.S. PATENT DOCUMENTS

| | | | |
|---|---|---|---|
| 2015/0096243 A1 | 4/2015 | Hohmann, Jr. | |
| 2015/0121792 A1 | 5/2015 | Spoo et al. | |

FOREIGN PATENT DOCUMENTS

| | | |
|---|---|---|
| GB | 1 575 501 | 9/1980 |
| GB | 2 069 024 A | 8/1981 |
| GB | 2 246 149 A | 1/1992 |
| GB | 2 265 164 A | 9/1993 |
| GB | 2459936 B | 3/2013 |

OTHER PUBLICATIONS

ASTM Standard Specification A951/A951M—11, Table 1, Standard Specification for Steel Wire for Masonry Joint Reinforcement, Nov. 14, 2011, 6 pages, West Conshohocken, Pennsylvania, United States.

State Board of Building Regulations and Standards, Building Envelope Requirements, 780 CMR sec. 1304.0 et seq., 7th Edition, Aug. 22, 2008, 11 pages, Boston, MA, United States.

Building Code Requirements for Masonry Structures and Commentary, TMS 402-11/ACI 530-11/ASCE May 11, 2011, Chapter 6, 12 pages.

Hohmann & Barnard, Inc., Product Catalog, 44 pgs (2003).

Hohmann & Barnard, Inc.; Product Catalog, 2009, 52 pages, Hauppauge, New York, United States.

Hohmann & Barnard, Inc., Product Catalog, 2013, 52 pages, Hauppauge, New York, United States.

Kossecka, Ph.D, et al., Effect of Insulation and Mass Distribution in Exterior Walls on Dynamic Thermal Performance of Whole Buildings, Thermal Envelopes VII/Building Systems—Principles p. 721-731, 1998, 11 pages.

Examination Report from Canadian Application No. 2,895,554, dated Jul. 11, 2017, 5 pages.

* cited by examiner

THERMAL WALL ANCHOR

CROSS-REFERENCE TO RELATED APPLICATION

This application is a continuation of U.S. application Ser. No. 14/313,689, filed Jun. 24, 2014, the entirety of which is incorporated herein by reference.

FIELD OF THE INVENTION

The present invention generally relates to anchoring systems for insulated cavity walls, and more specifically, a thermal wall anchor that creates a thermal break in a cavity wall.

BACKGROUND

Anchoring systems for cavity walls are used to secure veneer facings to a building and overcome seismic and other forces (e.g., wind shear, etc.). Anchoring systems generally form a conductive bridge or thermal pathway between the cavity and the interior of the building through metal-to-metal contact. Optimizing the thermal characteristics of cavity wall construction is important to ensure minimized heat transfer through the walls, both for comfort and for energy efficiency of heating and air conditioning. When the exterior is cold relative to the interior of a heated structure, heat from the interior should be prevented from passing through to the outside. Similarly, when the exterior is hot relative to the interior of an air conditioned structure, heat from the exterior should be prevented from passing through to the interior. The main cause of thermal transfer is the use of anchoring systems made largely of metal components (e.g., steel, wire formatives, metal plate components, etc.) that are thermally conductive. While providing the required high-strength within the cavity wall system, the use of metal components results in heat transfer. Failure to isolate the metal components of the anchoring system and break the thermal transfer results in heating and cooling losses and in potentially damaging condensation buildup within the cavity wall structure. However, a completely thermally-nonconductive anchoring system is not ideal because of the relative structural weakness of nonconductive materials.

SUMMARY

In one aspect, a wall anchor for use in a cavity wall to connect to a veneer tie to join an inner wythe and an outer wythe of the cavity wall includes an elongate body. The elongate body has a driven end portion and a driving end portion. The driven end portion is adapted to be threadedly mounted on the inner wythe of the cavity wall. The elongate body includes a barrel portion adjacent the driven end portion. A first end of the barrel portion is adapted to abut the inner wythe of the cavity wall when installed. A thermal coating is disposed on the driven end portion and the first end of the barrel portion. The thermal coating is configured and arranged to reduce thermal transfer in the cavity wall between the elongate body and the inner wythe when installed.

In another aspect, a wall anchor for use in a cavity wall to connect to a veneer tie to join an inner wythe and an outer wythe of the cavity wall includes an elongate body. The elongate body has a driven end portion and a driving end portion. The driven end portion is adapted to be threadedly mounted on the inner wythe of the cavity wall. The elongate body includes a barrel portion adjacent the driven end portion. A first end of the barrel portion is adapted to abut the inner wythe of the cavity wall when installed. A thermal coating is disposed on the first end of the barrel portion. The thermal coating is configured and arranged to reduce thermal transfer in the cavity wall between the elongate body and the inner wythe when installed.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
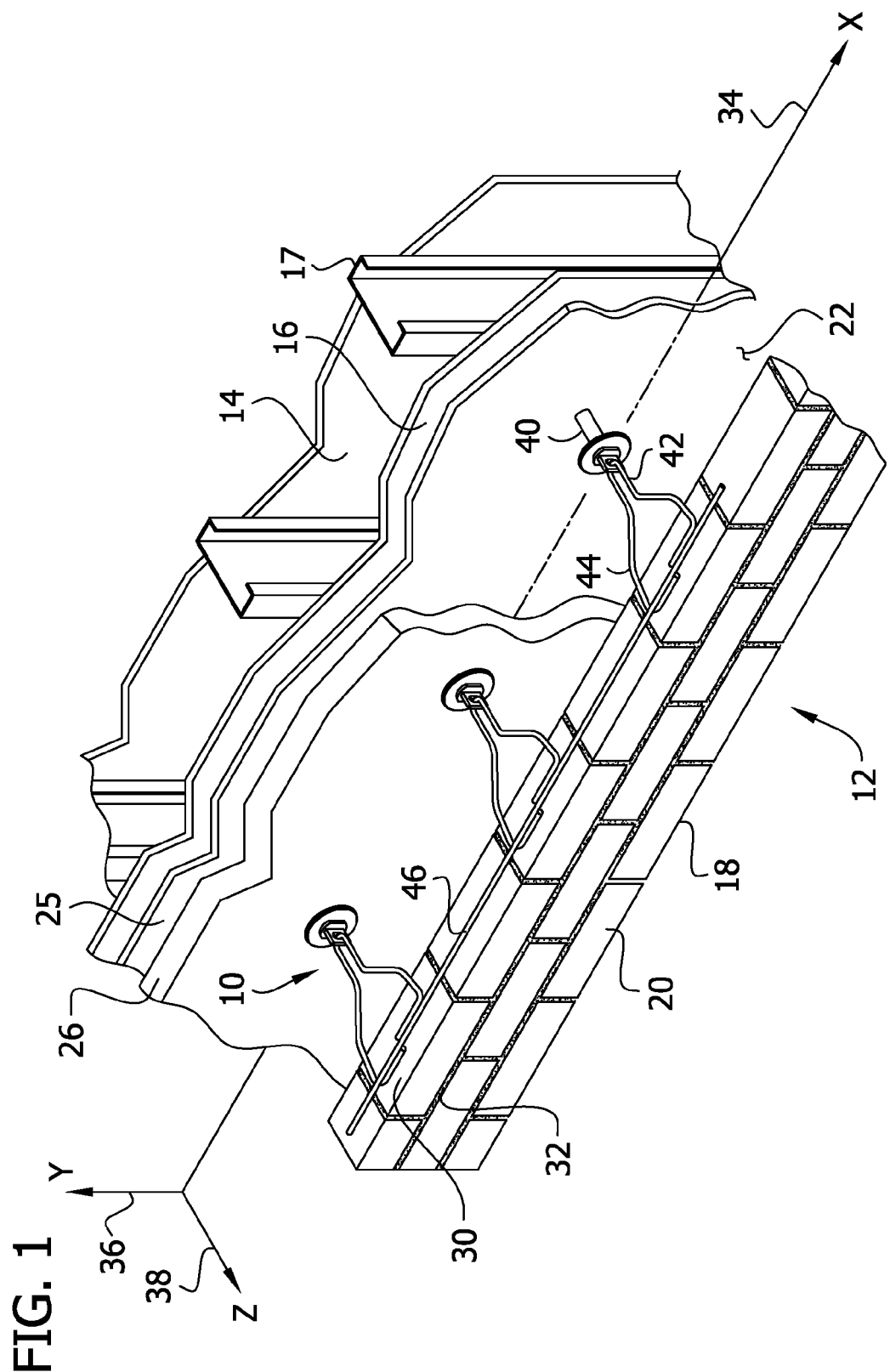
FIG. 1 is a perspective of an anchoring system as applied to a cavity wall with an inner wythe of an insulated dry wall construction and an outer wythe of brick.
Figure 2:
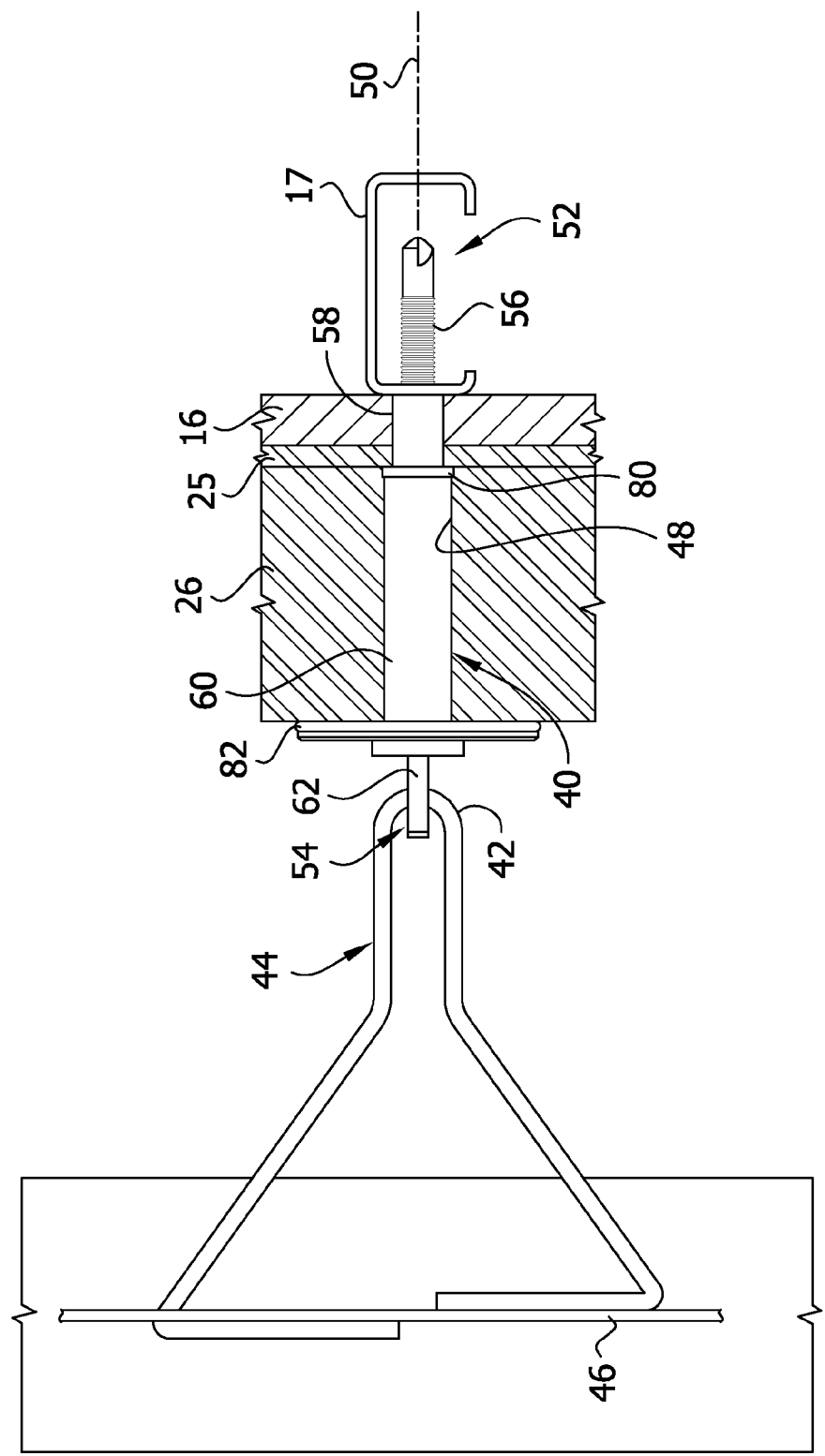
FIG. 2 is a fragmentary schematic elevation, partially in section, illustrating the anchoring system in use.
Figure 3:
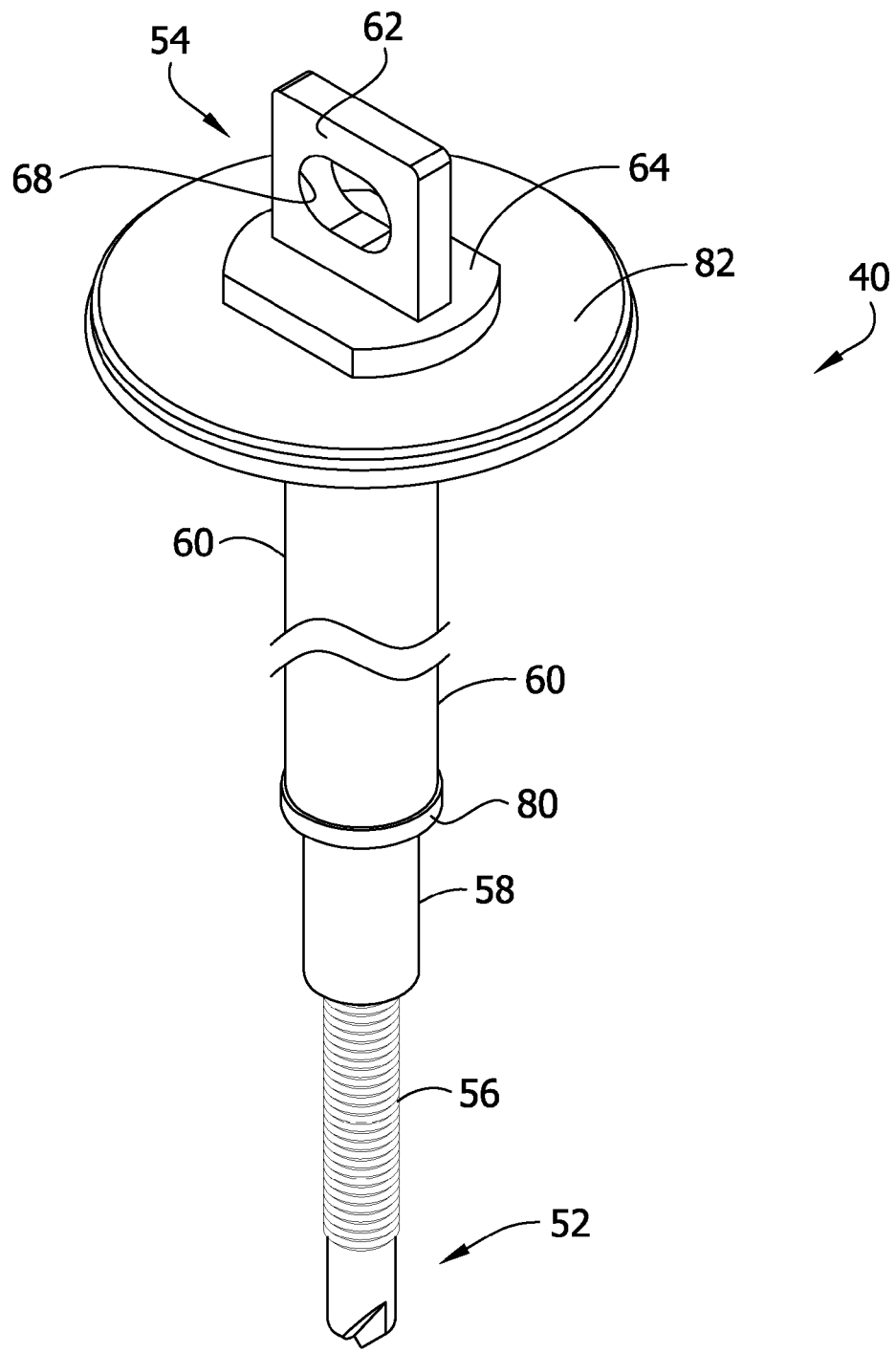
FIG. 3 is a perspective of a thermal wall anchor according to an embodiment of the present invention.
Figure 4:
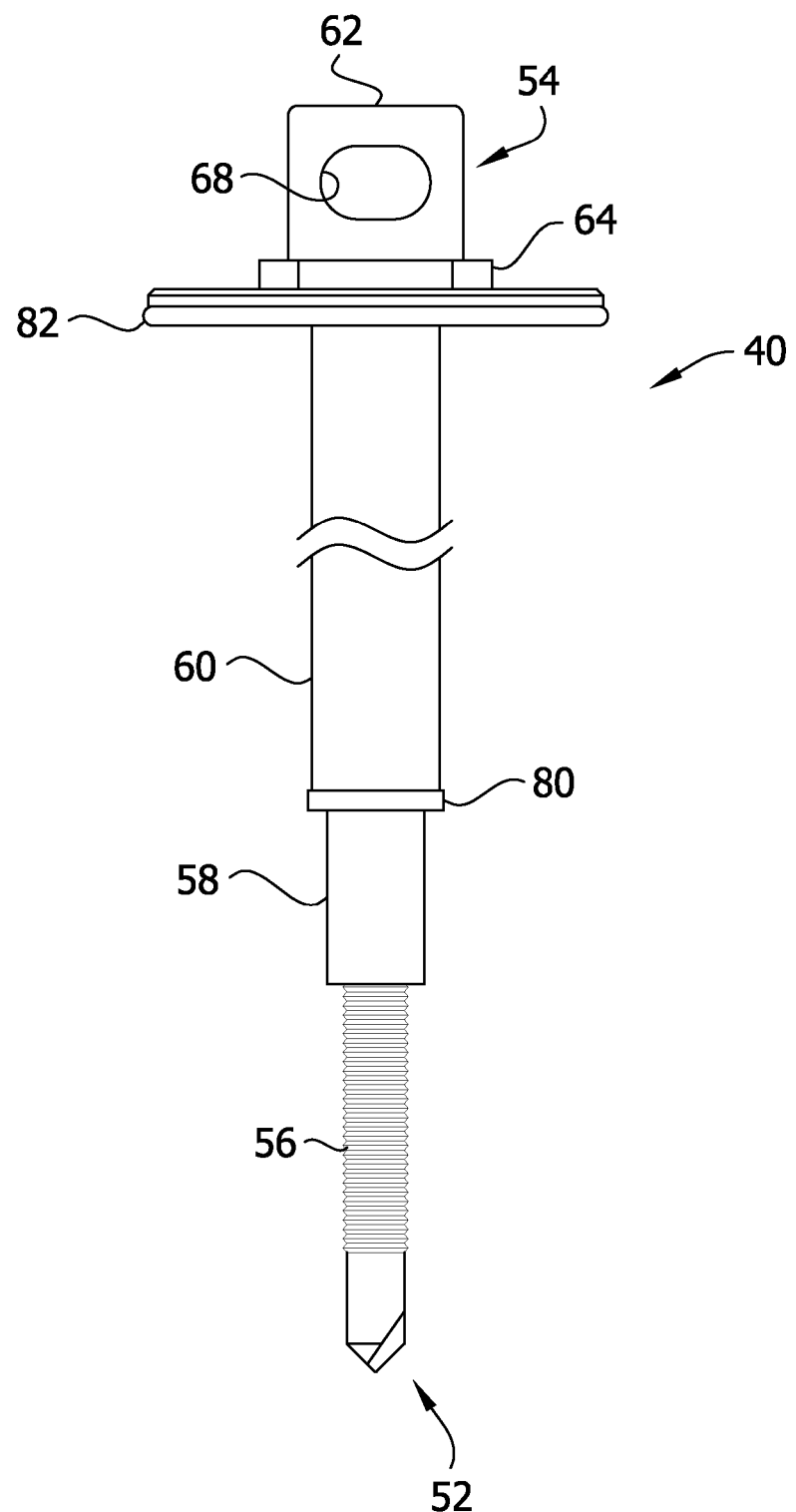
FIG. 4 is a front view thereof.
Figure 5:
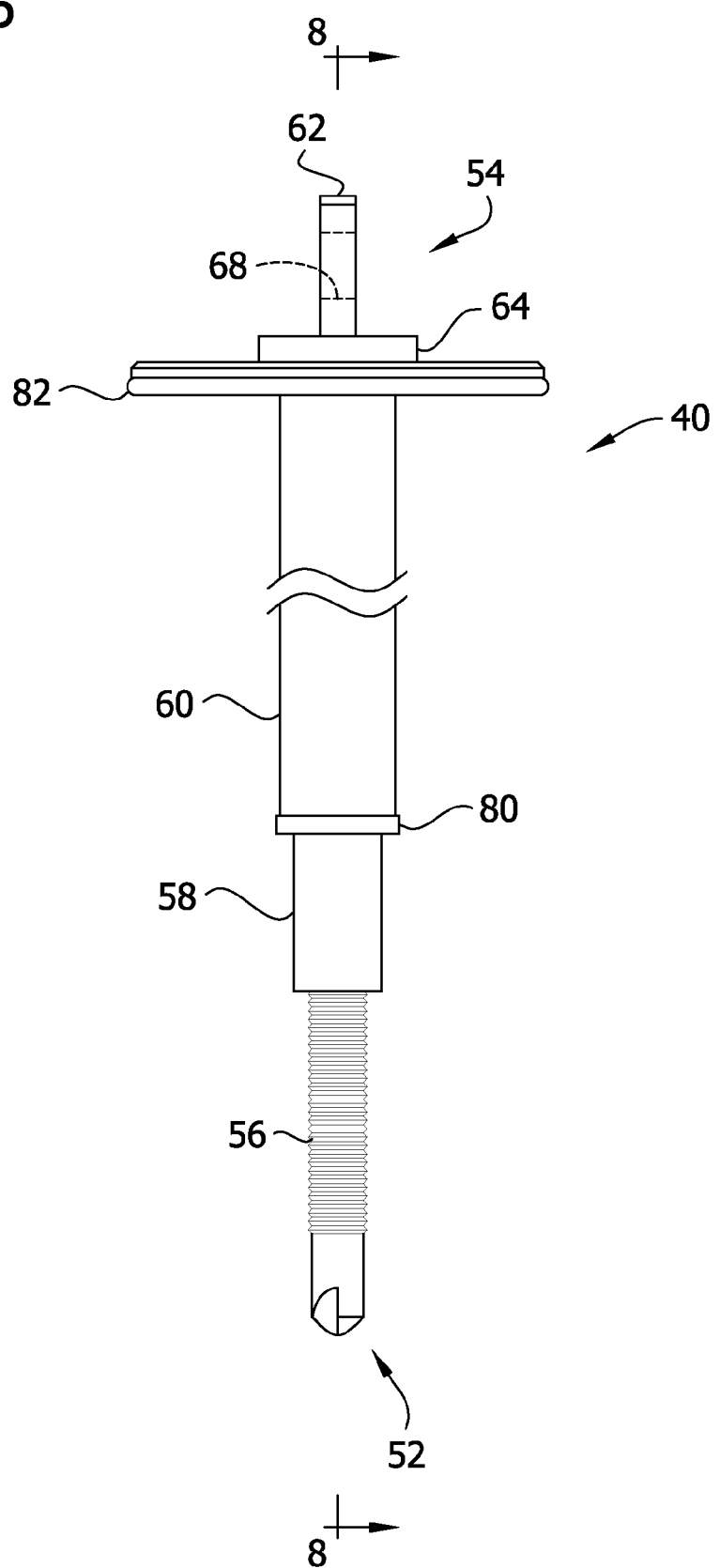
FIG. 5 is a left side view of the thermal wall anchor, the right side view being identical thereto.
Figure 6:
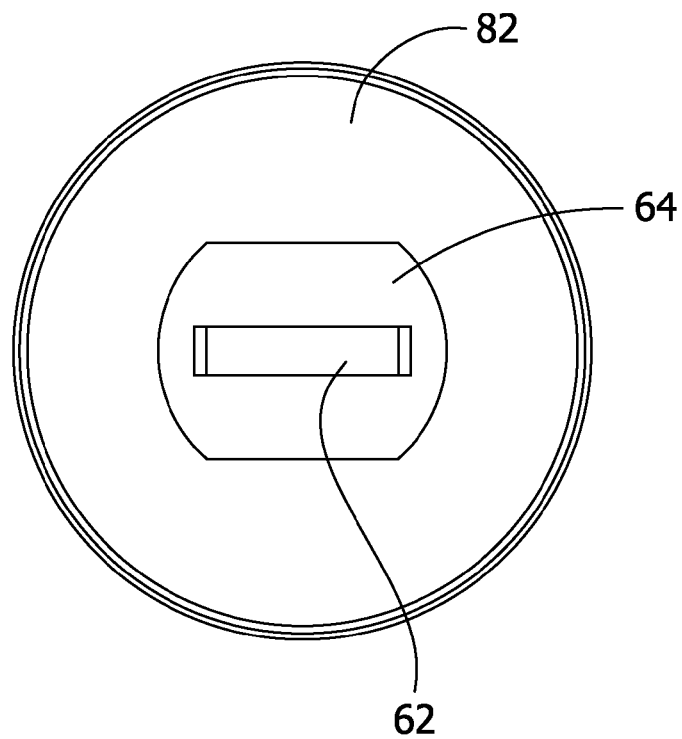
FIG. 6 is a top view of the thermal wall anchor.
Figure 7:
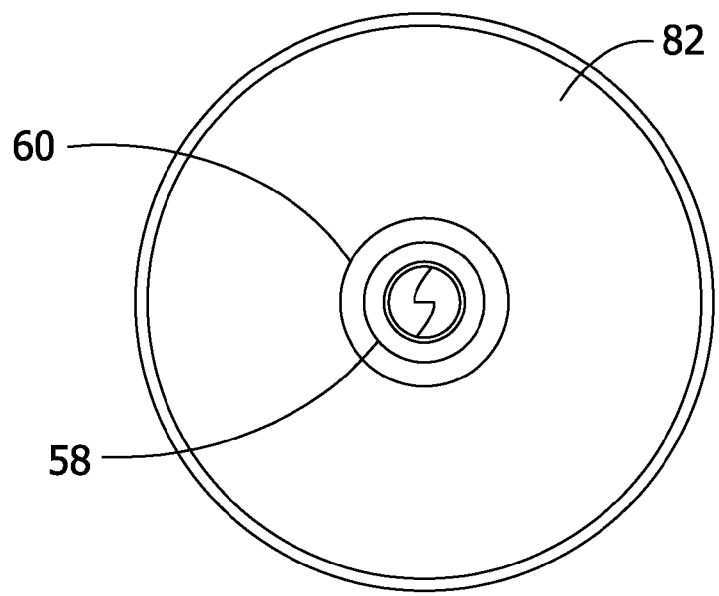
FIG. 7 is a bottom view thereof.
Figure 8:
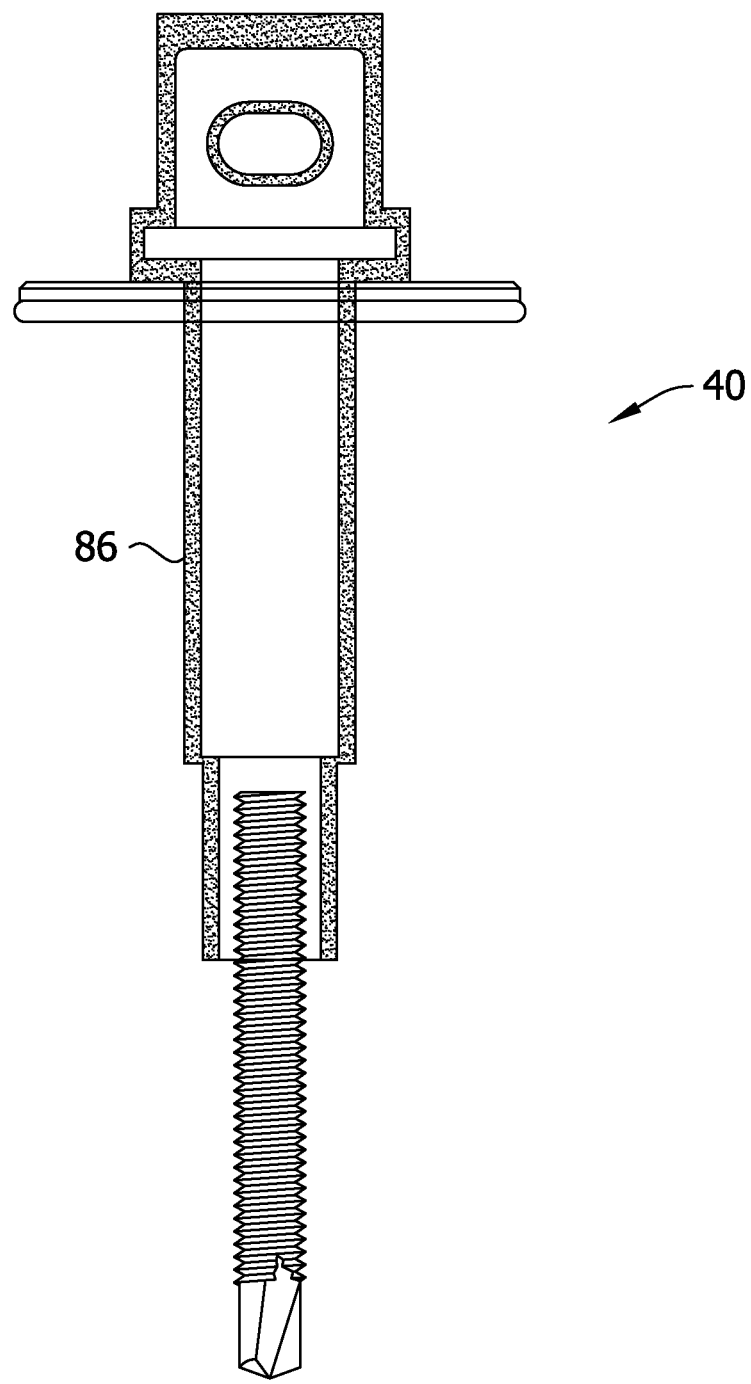
FIG. 8 is a section taken through line 8-8 of FIG. 5, illustrating the thermal coating of the wall anchor and the underlying metal components.
Figure 9:
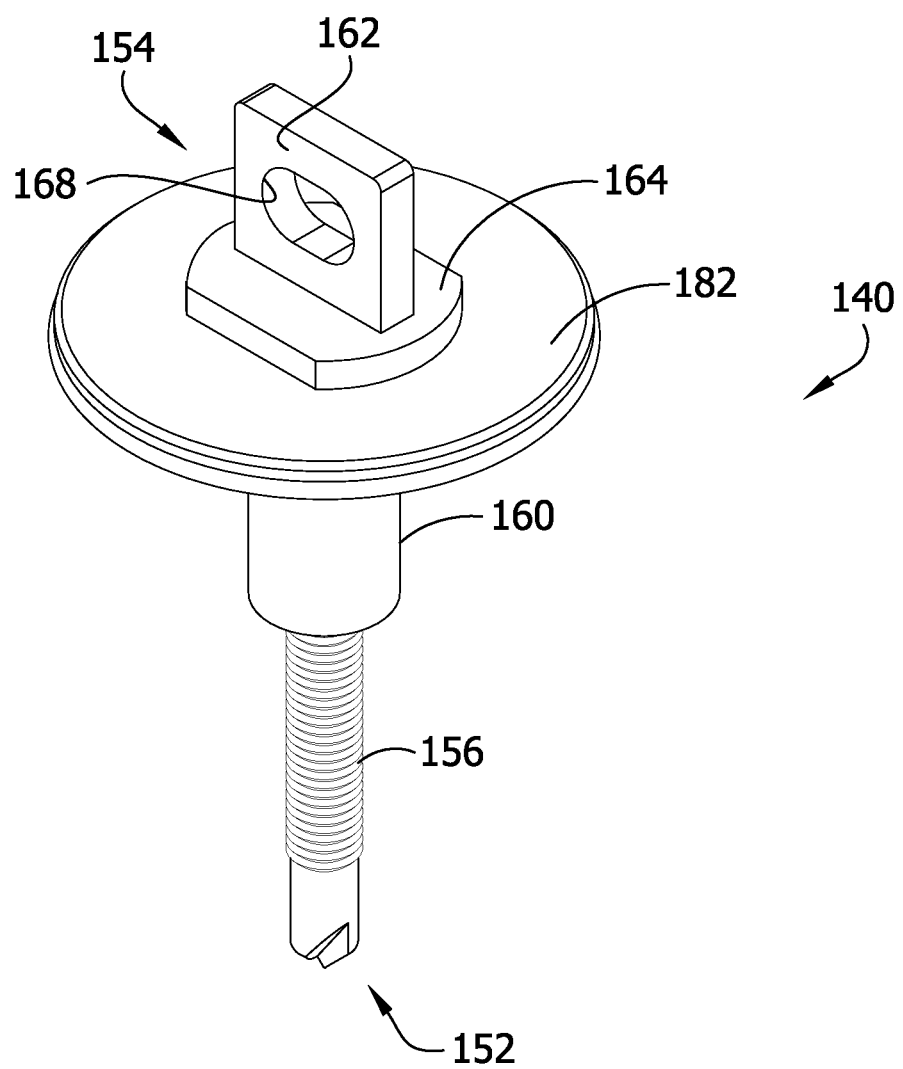
FIG. 9 is a perspective of a thermal wall anchor according to another embodiment of the present invention.
Figure 10:
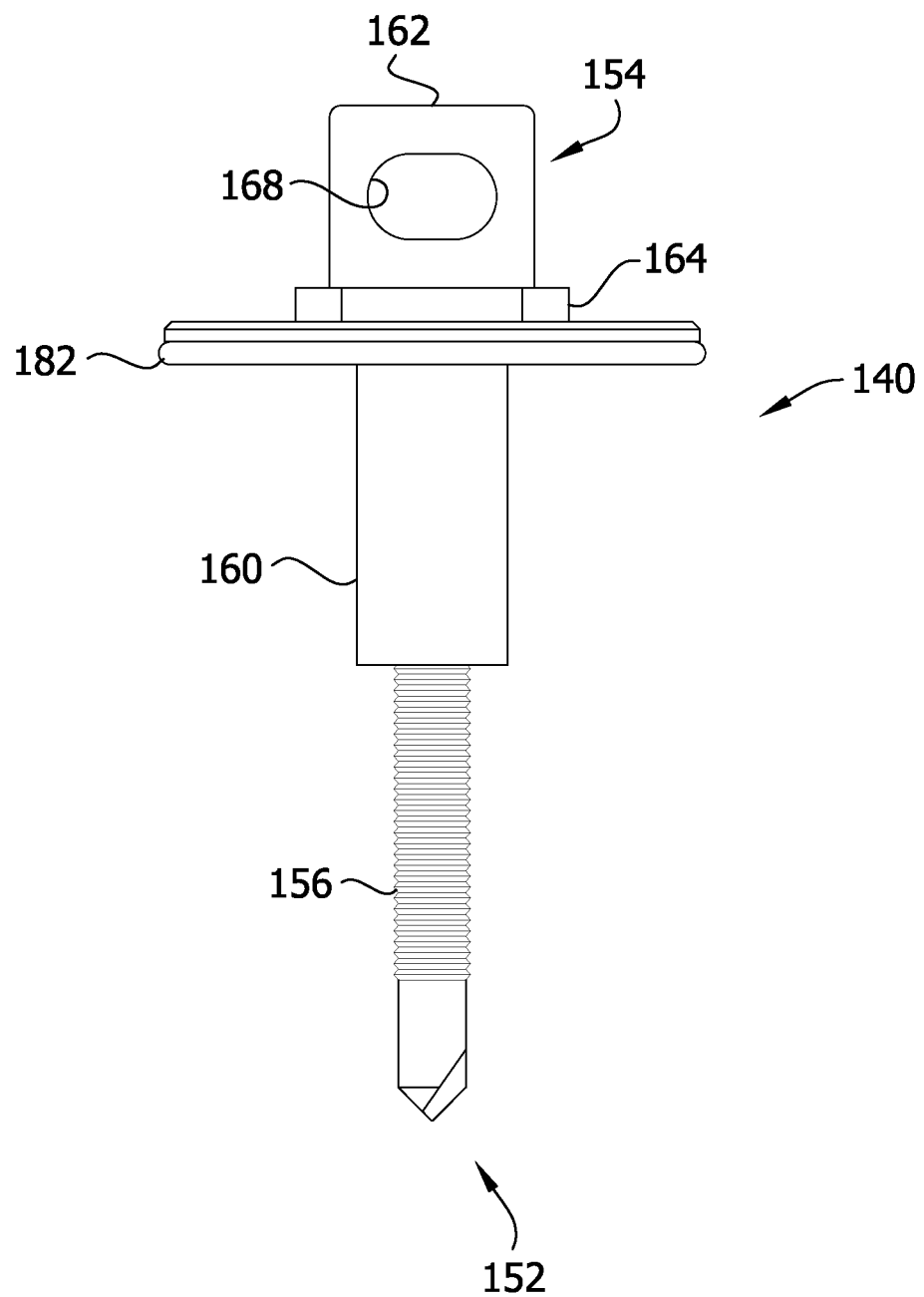
FIG. 10 is a front view thereof.
Figure 11:
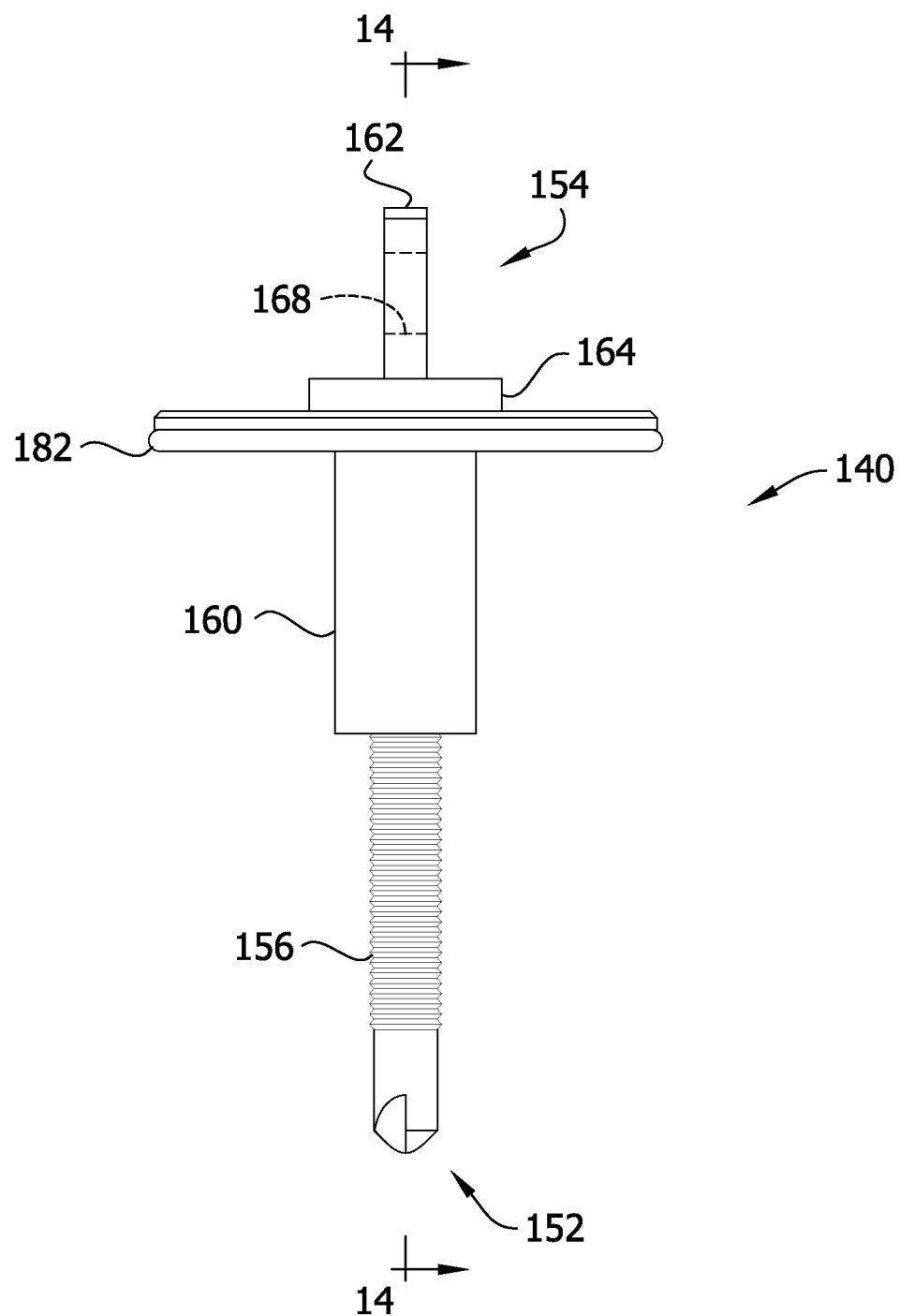
FIG. 11 is a left side view of the thermal wall anchor, the right side view being identical thereto.
Figure 12:
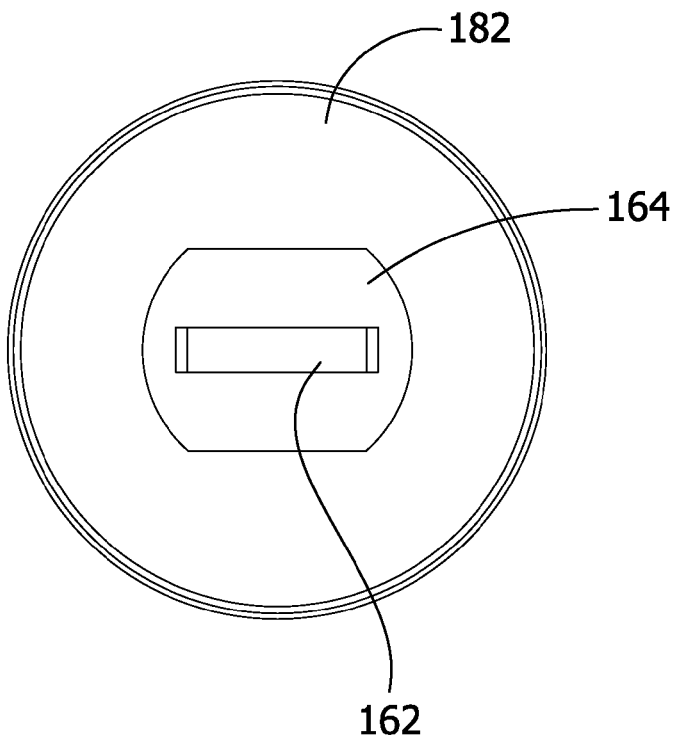
FIG. 12 is a top view of the thermal wall anchor.
Figure 13:
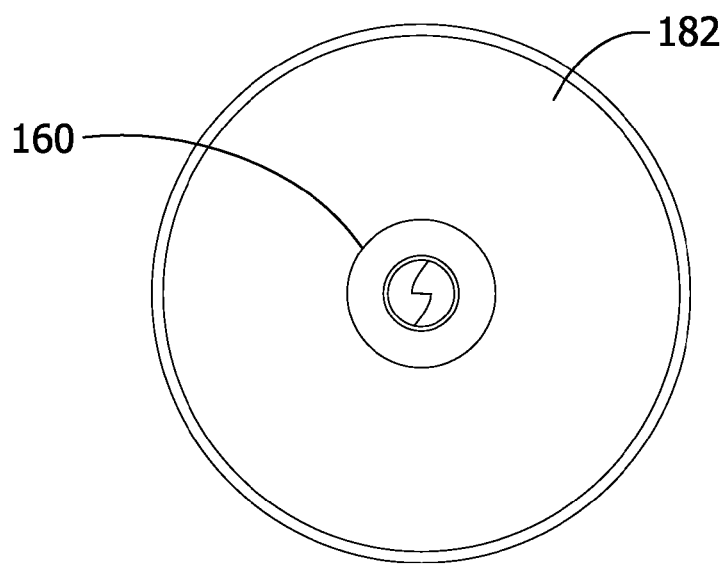
FIG. 13 is a bottom view thereof.
Figure 14:
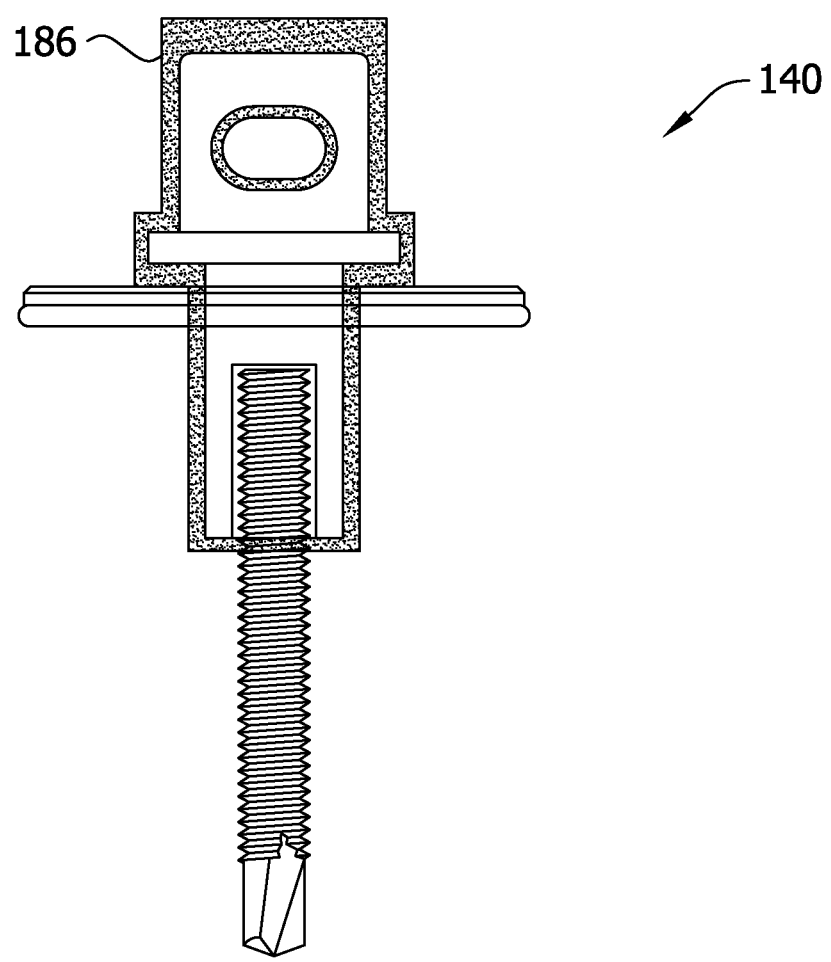
FIG. 14 is a section taken through line 14-14 of FIG. 11, illustrating the thermal coating of the wall anchor and the underlying metal components.
Figure 15:
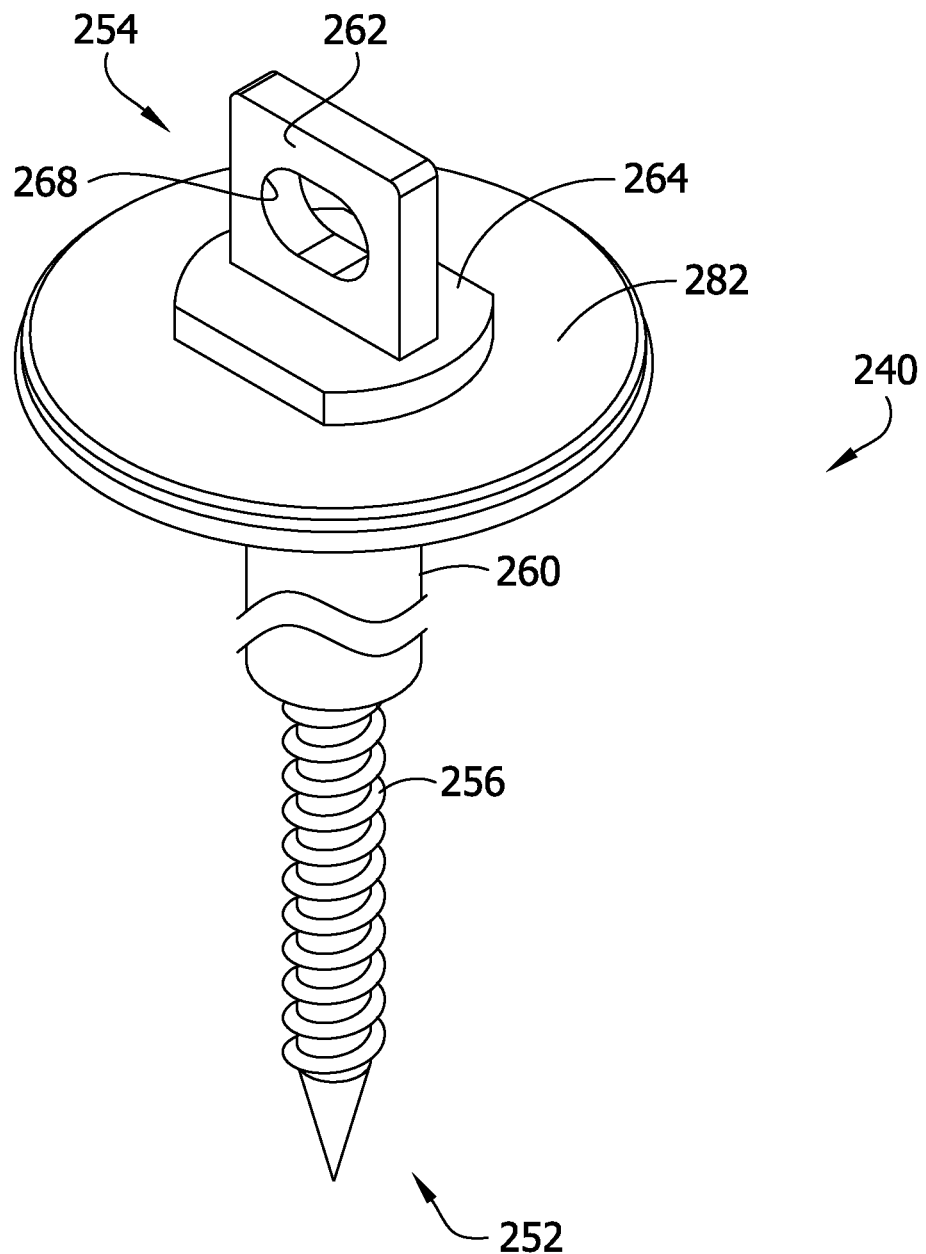
FIG. 15 is a perspective of a thermal wall anchor according to still another embodiment of the present invention.
Figure 16:
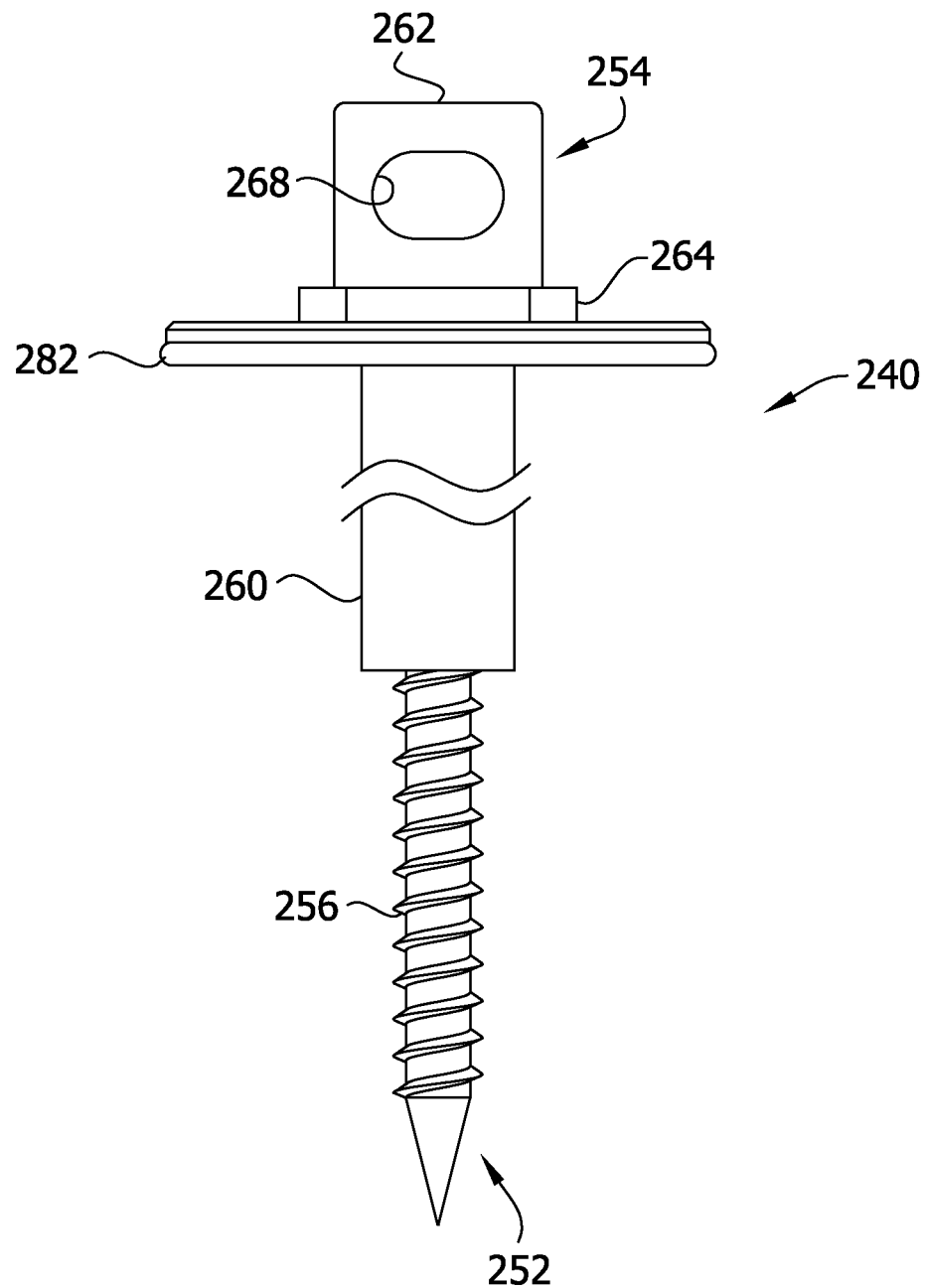
FIG. 16 is a front view thereof.
Figure 17:
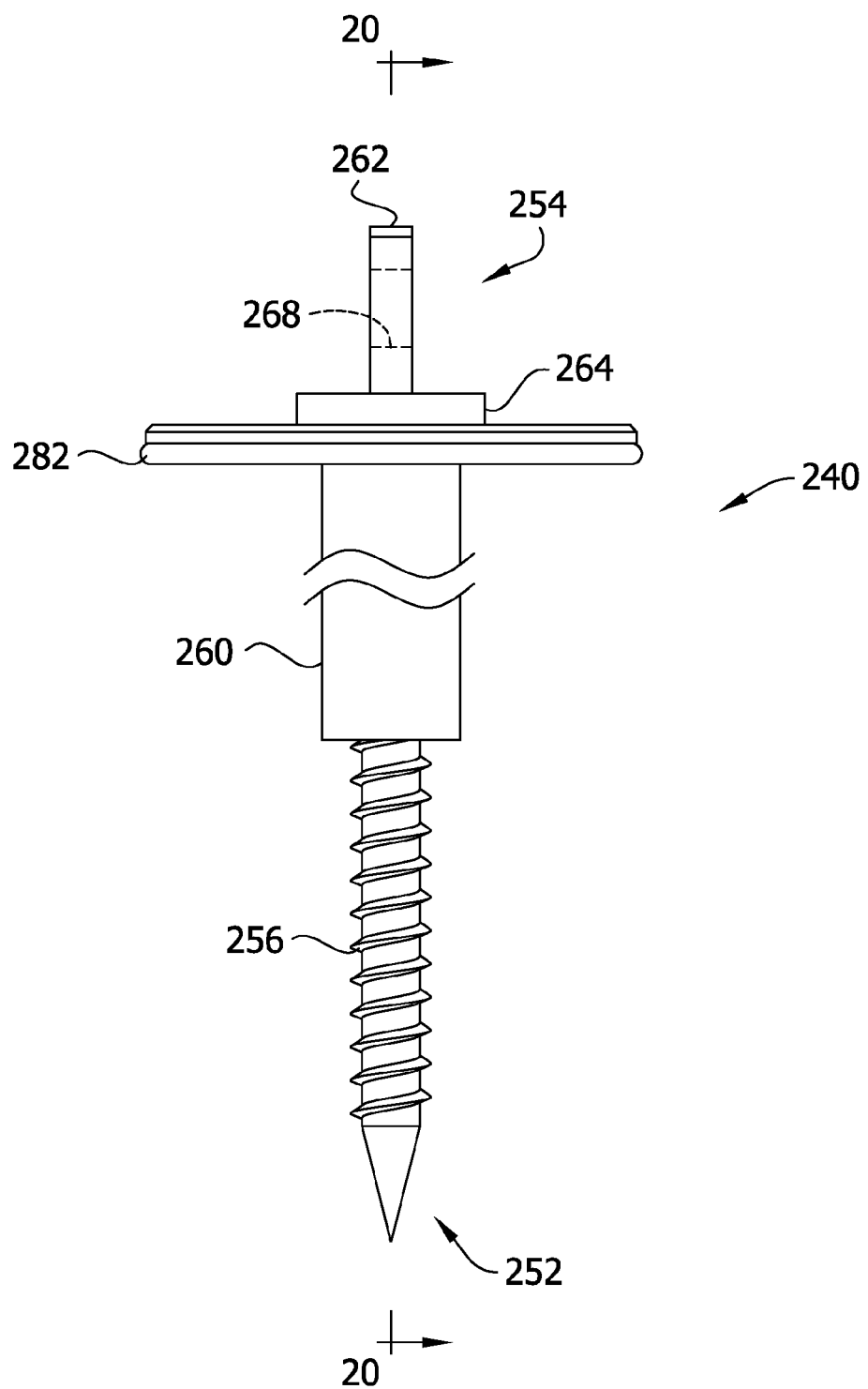
FIG. 17 is a left side view of the thermal wall anchor, the right side view being identical thereto.
Figure 18:
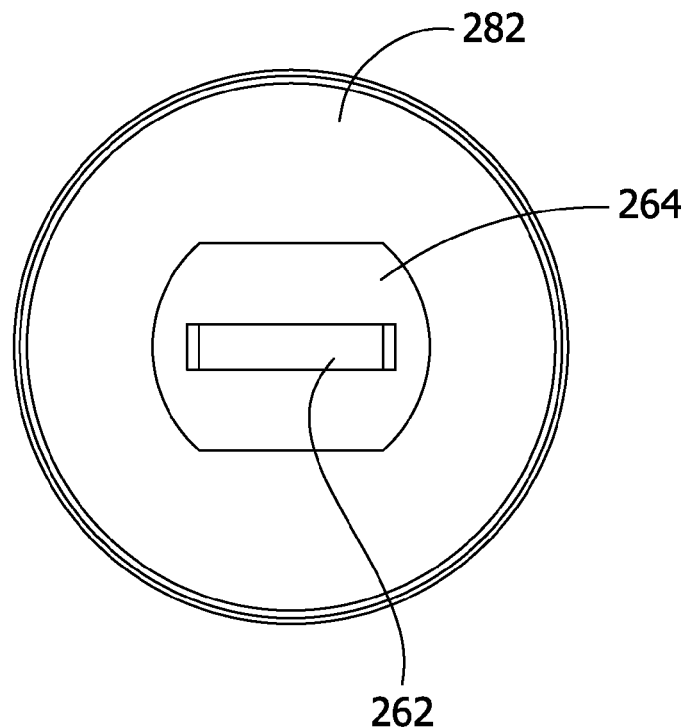
FIG. 18 is a top view of the thermal wall anchor.
Figure 19:
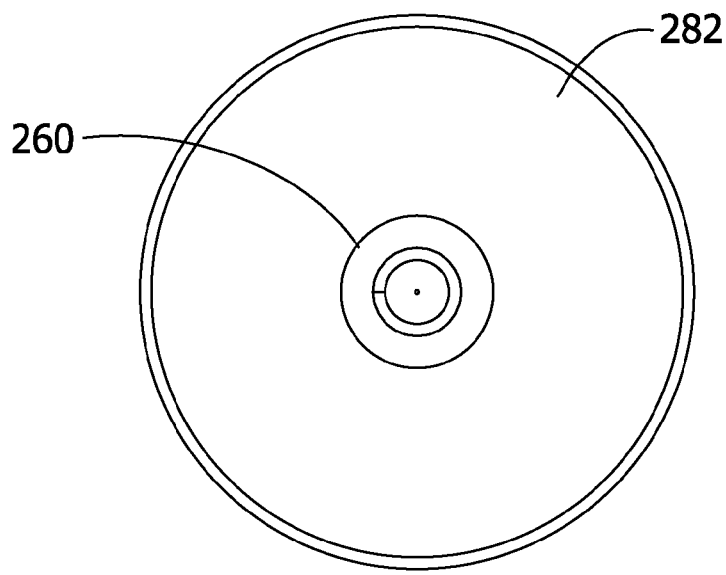
FIG. 19 is a bottom view thereof.
Figure 20:
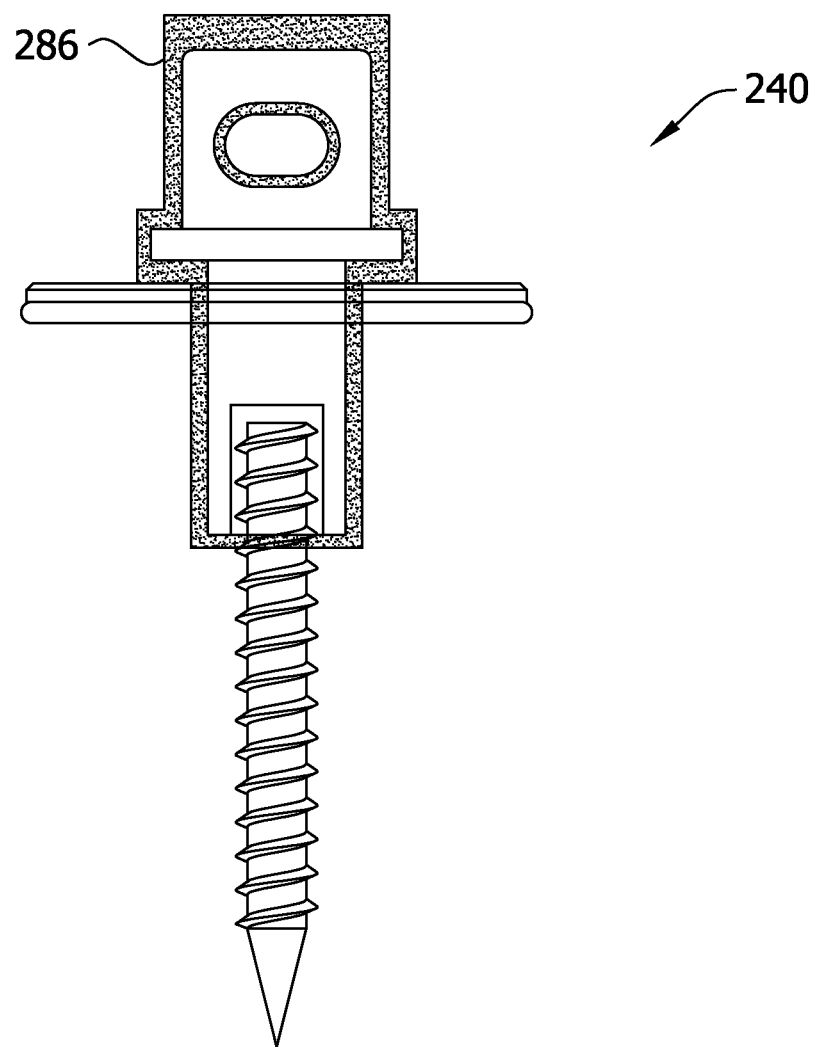
FIG. 20 is a section taken through line 20-20 of FIG. 17, illustrating the thermal coating of the wall anchor and the underlying metal components.

Referring to FIGS. 1 and 2, an anchoring system for cavity walls is shown generally at 10. A cavity wall structure generally indicated at 12 comprises an inner wythe or drywall backup 14 with sheetrock or wallboard 16 mounted on metal columns or studs 17 and an outer wythe or facing wall 18 of brick 20 construction. Between the inner wythe 14 and the outer wythe 18, a cavity 22 is formed. An air/vapor barrier 25 and insulation 26 are attached to an exterior surface of the inner wythe 14.

Successive bed joints 30 and 32 are substantially planar and horizontally disposed and, in accordance with building standards, are approximately 0.375 inches in height in a typical embodiment. Selective ones of bed joints 30 and 32, which are formed between courses of bricks 20, are constructed to receive the insertion portion of a veneer tie 44. It is understood that the described and illustrated wall structure 12 is exemplary only. Other structures may be used without departing from the scope of the present invention. A wall anchor 40 is threadedly mounted on the inner wythe 14 and is supported by the inner wythe. As described in greater detail below, the wall anchor 40 is configured to provide a thermal break in the cavity 22. The anchoring system 10 is constructed and configured to minimize air and moisture penetration around the wall anchor system/inner wythe juncture and limit thermal transfer.

For purposes of the description, an exterior cavity surface 24 of the inner wythe 14 contains a horizontal line or x-axis 34 and an intersecting vertical line or y-axis 36. A horizontal line or z-axis 38, normal to the xy-plane, passes through the coordinate origin formed by the intersecting x- and y-axes.

In the illustrated embodiment, the anchoring system 10 includes wall anchor 40, veneer tie 44, and an optional wire or outer wythe reinforcement 46. At intervals along the exterior surface 24 of the inner wythe 14, wall anchors 40 are driven into place in anchor-receiving channels 48 (see FIG. 2). Anchor-receiving channels 48 can be pre-drilled, or, alternatively, wall anchor 40 can be used to drill its own channel. The wall anchors 40 are positioned so that a longitudinal axis 50 of wall anchor 40 is normal to the xy-plane and taps into stud 17. Veneer tie 44 is shown in FIG. 1 as being placed on a course of bricks in preparation for being embedded in the mortar of bed joint 30. The veneer tie 44 is formed of wire and includes a U-shaped rear leg portion 42, as is known in the art. The wire reinforcement 46 is also constructed of a wire, as is known in the art, and preferably conforms to the joint reinforcement requirements of ASTM Standard Specification A951-00, Table 1. Wall anchors and veneer ties can be configured in other ways within the scope of the present invention.

In a first embodiment, illustrated in FIGS. 3-8, the wall anchor 40 includes an elongate body that extends along the longitudinal axis 50 of the anchor from a driven end portion 52 to a driving end portion 54. The driven end portion 52 includes a threaded portion 56 (e.g., a self-drilling screw portion). The threaded portion 56 can be configured for attachment to a metal stud (FIGS. 3-14), a wooden stud (FIGS. 15-20), a concrete backup wall (FIGS. 15-20), or alternative backup wall constructions. In use, the driven end portion 52 is driven into stud 17, mounting the wall anchor 40 on the inner wythe 14. The elongate body of the wall anchor 40 also includes a non-threaded barrel. In the embodiment of FIGS. 3-8, the wall anchor 40 includes a dual-diameter barrel with a smaller diameter barrel or first shaft portion 58 toward the driven end portion 52 and a larger diameter barrel or second shaft portion 60 toward the driving end portion 54.

A drive head 62 is located at the driving end portion 54 of the anchor 40. The elongate body includes a flange 64 at the junction of the drive head 62 and the barrel portion 60. The drive head 62 defines a receptor or aperture 68 for receiving the U-shaped rear leg portion 42 of the veneer tie 44. As shown in FIGS. 1 and 2, the rear leg 42 of the veneer tie 44 is inserted into the aperture 68 of the drive head 62, thereby securing the veneer tie to the wall anchor 40.

The wall anchor 40 includes a thermal coating 86 (FIG. 8) that is configured to provide a thermal break in the cavity 22. The main components of the wall anchor are preferably made of metal (e.g., steel) to provide a high-strength anchoring system. Through the use of a thermal coating, the underlying metal components of the anchor obtain a lower thermal conductive value (K-value), thereby providing a high strength anchor with the benefits of thermal isolation. Likewise, the entire cavity wall 12 obtains a lower transmission value (U-value), thereby providing an anchoring system with the benefits of thermal isolation. The term K-value is used to describe the measure of heat conductivity of a particular material, i.e., the measure of the amount of heat, in BTUs per hour, that will be transmitted through one square foot of material that is one inch thick to cause a temperature change of one degree Fahrenheit from one side of the material to the other (BTU/(hr·ft·° F.); or W/(m·K) in SI units). The lower the K-value, the better the performance of the material as an insulator. The metal components of the anchoring systems generally have a K-value range of 16 to 116 W/(m·K) (about 9 to 67 BTU/(hr·ft·° F.)). The coated wall anchor as described below greatly reduces the K-values to a low thermal conductive K-value not to exceed 1 W/(m·K) (about 0.58 BTU/(hr·ft·° F.)), for example about 0.7 W/(m·K) (about 0.4 BTU/(hr·ft·° F.)). The term U-value is used to describe the transmission of heat through the entire cavity wall (including the anchor, the insulation, and other components), i.e., the measure of the rate of transfer of heat through one square meter of a structure divided by the difference in temperature across the structure. Similar to the K-value, the lower the U-value, the better the thermal integrity of the cavity wall, and the higher the U-value, the worse the thermal performance of the building envelope. The U-value is calculated from the reciprocal of the combined thermal resistances of the materials in the cavity wall, taking into account the effect of thermal bridges, air gaps and fixings. Several factors affect the U-value, such as the size of the cavity, the thickness of the insulation, the materials used, etc. Desirably, the use of anchor as described herein may reduce the U-value of a wall by 5% -80%.

An interior surface of the aperture 68 of the drive head 62 (i.e., the portion of the wall anchor 40 that contacts the veneer tie 44) is coated with a thermal coating to provide a thermal break in the cavity. Other portions of the wall anchor 40 can also include a thermal coating. In one embodiment, the portion of the wall anchor 40 that is positioned at a juncture of the wall anchor and the inner wythe or metal stud (e.g., the threaded portion 56 and/or the smaller barrel portion 58) includes a thermal coating to reduce thermal transmission from contact of the anchor with the inner wythe and particularly the metal stud 17. In the illustrated embodiment, the drive head 42, flange 64, larger barrel portion 60, and smaller barrel portion 58 include a thermal coating. As illustrated, portions of the anchor 40 can be uncoated (e.g., the threaded portion 56). Alternatively, the entire wall anchor 40 can be coated. The thermal coating is selected from thermoplastics, thermosets, natural fibers, rubbers, resins, asphalts, ethylene propylene diene monomers, and admixtures thereof and can be applied in layers. The thermal coating optionally contains an isotropic polymer which includes, but is not limited to, acrylics, nylons, epoxies, silicones, polyesters, polyvinyl chlorides, polyethylenes, and chlorosulfonated polyethylenes. Alternatively, the thermal coating can be a ceramic or ceramic-based coating including materials selected from lanthanum, cerium, praseodymium, neodymium, promethium, samarium, europium, gadolinium, terbium, dysprosium, holmium, erbium, thulium, ytterbium, lutetium, indium, scandium, yttrium, zirconium, hafnium, titanium, silica, zirconia, magnesium zirconate, yttria-stabilized zirconia, and derivatives and admixtures thereof. An initial layer of the thermal coating can be cured to provide a pre-coat and the layers of the thermal coating can be cross-linked to provide high-strength adhesion to the anchor to resist chipping or wearing of the thermal coating.

The thermal coating reduces the K-value of the underlying metal components which include, but are not limited to, mill galvanized, hot galvanized, and stainless steel. Such components have K-values that range from 16 to 116 W/(m·K). The thermal coating reduces the K-value of the anchor to not exceed 1.0 W/(m·K). Likewise, the thermal anchor reduces the U-value of the cavity wall structure. Preferably, the U-value of the cavity wall structure including the thermal anchor is reduced by 5-80% as compared to the U-value of the cavity wall structure including an anchor without the thermal coating described herein. The thermal coating is fire resistant and gives off no toxic smoke in the event of a fire. Furthermore, the coating is suited to the application in an anchoring system with characteristics such as shock resistance, non-frangibility, low thermal conductivity and transmissivity, and a non-porous resilient finish. Additionally, the thermal coating can provide corrosion protection which protects against deterioration of the anchoring system over time.

The thermal coating can be applied through any number of methods including fluidized bed production, thermal spraying, hot dip processing, heat-assisted fluid coating, or extrusion, and includes both powder and fluid coating to form a reasonably uniform coating. The coating preferably has a thickness selected to provide a thermal break in the cavity. In one embodiment, the thickness of the coating is at least about 3 microns, such as a thickness in the range of approximately 3 microns to approximately 300 microns, and in one embodiment is about 127 microns. The thermal coating is cured to achieve good cross-linking of the layers. Appropriate examples of the nature of the coating and application process are set forth in U.S. Pat. Nos. 6,284,311 and 6,612,343.

In one exemplary test, a model cavity wall structure was configured to measure the reduction in U-value between a non-coated anchor and an anchor having a thermal coating as described. The model comprised many layers creating an 8 foot tall wall cross section. The wall included, from the exterior face to the interior face, an outer wythe comprising standard 3⅝ inch by 3⅝ inch medium density brick with a ⅜ inch mortar joint, a 2 inch slightly ventilated air cavity, 2 inches of extruded polystyrene, ⅝ inch gypsum board, a 6 inch steel stud, and ½ inch gypsum board. Exterior and interior boundary conditions were applied to the model. The exterior boundary condition was a −0.4° F. air temperature and the interior boundary condition was a 69.8° F. air temperature. In the model, veneer ties are embedded into the brick mortar and wall anchors penetrated through the extruded polystyrene and into the steel stud. In one model, the wall anchors did not include a thermal coating, and the modeled vertical cross section U-value was 0.235 BTU/(hr·ft$^{2 \cdot \circ}$ F.). In another model, the wall anchors included a thermal coating as described above, and the modeled vertical cross section U-value was reduced to 0.150 BTU/(hr·ft$^{2 \cdot \circ}$ F.), nearly a 40% reduction. Although only an illustrative model, the test results indicate that the U-value of the cavity wall structure is greatly reduced through use of a wall anchor with thermal coating.

As illustrated, a wall anchor 40 according to the present invention can also include a dual seal system to prevent air and moisture penetration through the cavity wall structure. An internal seal 80 is located at the junction of the smaller and larger barrel portions 58, 60. The internal seal 80 can be a stabilizing neoprene fitting, a steel washer with a neoprene gasket, or a bonded sealing washer, such as a sealing washer having a backing (e.g., nylon, stainless steel, galvanized steel) with a bonded sealant (e.g., ethylene propylene diene (EPDM) rubber, neoprene, silicone). When fully driven into stud 17, the threaded portion 56 and smaller barrel portion 58 of wall anchor 40 pierce the sheetrock or wallboard 16 and air/vapor barrier 25, extending through an inner portion of anchor-receiving channel 48. As described above, these portions of the wall anchor 40 that contact the inner wythe can include a thermal coating to prevent thermal transmission between the inner wythe and the wall anchor. The internal seal 80 covers the insertion point of the smaller barrel portion 58 and the threaded portion 56 through the inner channel portion, precluding air and moisture penetration through the channel and maintaining the integrity of the air/vapor barrier 25 and also providing a barrier to heat transfer.

The wall anchor 40 can also include an external seal 82 located at the junction of the drive head 62 and the larger barrel portion 60. The external seal 82 can be a stabilizing neoprene fitting, a steel washer with a neoprene gasket, or a bonded sealing washer, such as a sealing washer having a backing (e.g., nylon, stainless steel, galvanized steel) with a bonded sealant (e.g., EPDM rubber, neoprene, silicone). Upon installation of wall anchor 40 through rigid insulation 26, the larger barrel portion 60 is forced into a press fit relationship with an external portion of anchor-receiving channel 48. Stabilization of this stud-type wall anchor 40 is attained by larger barrel portion and internal seal 80 completely filling the external channel portion, with external seal 82 capping the opening of the channel 48 into the cavity 22 and clamping wall anchor 40 in place. The external seal 82 clamps the wall anchor 40 in place and also holds the insulation 26 in place. This arrangement does not leave any end play or wiggle room for pin-point loading of the wall anchor and therefore does not loosen over time. With external seal 82 in place, the insulation integrity within the cavity wall is maintained, because the larger surface area of the external seal helps to hold the insulation in place without tearing. The external seal 82 preferably extends beyond the flange 64 of the anchor 40 to completely seal the opening in the insulation 26. It will be understood that the seal system may be omitted or have a different configuration than described within the scope of the present invention.

In producing wall anchor 40, the length of the smaller diameter barrel 58 less the height of the internal seal 80 is dimensioned to match the combined thickness of the air/vapor barrier 25 and the wall board 16. Similarly, the length of the larger diameter barrel 60 plus the height of the internal seal 80 is dimensioned to match the thickness of the insulation 26. This configuration allows for sealing of the anchor-receiving channels 48 upon insertion of the wall anchor 40. However, other configurations of the anchor 40 do not depart from the scope of the present invention.

A second embodiment of a wall anchor with thermal coating is illustrated in FIGS. 9-14. Wall anchor 140 is substantially similar to wall anchor 40 described above, with differences as pointed out herein.

Wall anchor 140 includes an elongate body that extends along the longitudinal axis 150 of the anchor from a driven end portion 152 to a driving end portion 154. The driven end portion 152 includes a threaded portion 156 configured for attachment to a metal stud. Wall anchor 140 is used as described above with reference to wall anchor 40. Wall anchor 140 includes a single diameter barrel 160. A drive head 162 is located at the driving end portion 154 of the anchor 140. The elongate body includes a flange 164 at the junction of the drive head 162 and the barrel 160. The drive head 162 defines a receptor or aperture 168 for receiving a portion of a veneer tie, as described above.

The wall anchor 140 includes a thermal coating 186 (FIG. 14) that is configured to provide a thermal break in the cavity. The main components of the wall anchor are preferably made of metal (e.g., steel) to provide a high-strength anchoring system. Through the use of a thermal coating, the underlying metal components of the anchor obtain a lower thermal conductive value (K-value), thereby providing a high strength anchor with the benefits of thermal isolation. Likewise, the entire cavity wall structure obtains a lower transmission value (U-value), thereby providing an anchoring system with the benefits of thermal isolation. An interior surface of the aperture 168 of the drive head 162 (i.e., the portion of the wall anchor 140 that contacts a veneer tie) is coated with a thermal coating to provide a thermal break in the cavity. Other portions of the wall anchor 140 can also include a thermal coating. In one embodiment, the portion of the wall anchor 140 that is positioned at a juncture of the wall anchor and the inner wythe or metal stud (e.g., the threaded portion 156 and/or the barrel portion 160) includes a thermal coating to reduce thermal transmission from contact of the anchor with the inner wythe and particularly the metal stud 17. In the illustrated embodiment, the drive head 142, flange 164, and barrel portion 160 include a thermal coating. As illustrated, portions of the anchor 140 can be uncoated (e.g., the threaded portion 156). Alternatively, the entire wall anchor 140 can be coated. The thermal coating is selected from thermoplastics, thermosets, natural fibers, rubbers, resins, asphalts, ethylene propylene diene monomers, and admixtures thereof and can be applied in layers. The thermal coating optionally contains an isotropic polymer which includes, but is not limited to, acrylics, nylons, epoxies, silicones, polyesters, polyvinyl chlorides, polyethylenes, and chlorosulfonated polyethylenes. Alternatively, the thermal coating can be a ceramic or ceramic-based coating including materials selected from lanthanum, cerium, praseodymium, neodymium, promethium, samarium, europium, gadolinium, terbium, dysprosium, holmium, erbium, thulium, ytterbium, lutetium, indium, scandium, yttrium, zirconium, hathium, titanium, silica, zirconia, magnesium zirconate, yttria-stabilized zirconia, and derivatives and admixtures thereof. An initial layer of the thermal coating can be cured to provide a pre-coat and the layers of the thermal coating can be cross-linked to provide high-strength adhesion to the anchor to resist chipping or wearing of the thermal coating.

The thermal coating reduces the K-value of the underlying metal components which include, but are not limited to, mill galvanized, hot galvanized, and stainless steel. Such components have K-values that range from 16 to 116 W/(m·K). The thermal coating reduces the K-value of the anchor to not exceed 1.0 W/(m·K). Likewise, the thermal anchor reduces the U-value of the cavity wall structure. Preferably, the U-value of the cavity wall structure including the thermal anchor is reduced by 5-80% as compared to the U-value of the cavity wall structure including an anchor without the thermal coating described herein. The thermal coating is fire resistant and gives off no toxic smoke in the event of a fire. Furthermore, the coating is suited to the application in an anchoring system with characteristics such as shock resistance, non-frangibility, low thermal conductivity and transmissivity, and a non-porous resilient finish.

Additionally, the thermal coating can provide corrosion protection which protects against deterioration of the anchoring system over time.

The thermal coating can be applied through any number of methods including fluidized bed production, thermal spraying, hot dip processing, heat-assisted fluid coating, or extrusion, and includes both powder and fluid coating to form a reasonably uniform coating. The coating preferably has a thickness selected to provide a thermal break in the cavity. In one embodiment, the thickness of the coating is at least about 3 microns, such as a thickness in the range of approximately 3 microns to approximately 300 microns. In one embodiment, a coating having a thickness of at least about 127 microns is applied to anchor 140. The thermal coating is cured to achieve good cross-linking of the layers. Appropriate examples of the nature of the coating and application process are set forth in U.S. Pat. Nos. 6,284,311 and 6,612,343.

Wall anchor 140 can also include a seal 182, which functions as seal 82 described above, to preclude air and moisture penetration and maintain the integrity of the insulation upon installation of the anchor. It will be understood that the seal system may be omitted or have a different configuration than described within the scope of the present invention.

A third embodiment of a wall anchor with thermal coating is illustrated in FIGS. 15-20. Wall anchor 240 is substantially similar to wall anchors 40, 140 described above, with differences as pointed out herein.

Wall anchor 240 includes an elongate body that extends along the longitudinal axis 250 of the anchor from a driven end portion 252 to a driving end portion 254. The driven end portion 252 includes a threaded portion 256 configured for attachment to a masonry backup wall or a wood stud. Wall anchor 240 is used as described above with reference to wall anchor 40. Wall anchor 240 includes a single diameter barrel 260. A drive head 262 is located at the driving end portion 254 of the anchor 240. The elongate body includes a flange 264 at the junction of the drive head 262 and the barrel 260. The drive head 262 defines a receptor or aperture 268 for receiving a portion of a veneer tie, as described above.

The wall anchor 240 includes a thermal coating 286 (FIG. 20) that is configured to provide a thermal break in the cavity. The main components of the wall anchor are preferably made of metal (e.g., steel) to provide a high-strength anchoring system. Through the use of a thermal coating, the underlying metal components of the anchor obtain a lower thermal conductive value (K-value), thereby providing a high strength anchor with the benefits of thermal isolation. Likewise, the entire cavity wall structure obtains a lower transmission value (U-value), thereby providing an anchoring system with the benefits of thermal isolation. An interior surface of the drive head 262 defining the aperture 268 (i.e., the portion of the wall anchor 240 that contacts a veneer tie) is coated with a thermal coating to provide a thermal break in the cavity. Other portions of the wall anchor 240 can also include a thermal coating. In one embodiment, the portion of the wall anchor 240 that is positioned at a juncture of the wall anchor and the inner wythe (e.g., the threaded portion 256 and/or the barrel portion 260) includes a thermal coating to reduce thermal transmission from contact of the anchor with the inner wythe. In the illustrated embodiment, the drive head 242, flange 264, and barrel 260 include a thermal coating. As illustrated, portions of the anchor 240 can be uncoated (e.g., the threaded portion 256). Alternatively, the entire wall anchor 240 can be coated. The thermal coating is selected from thermoplastics, thermosets, natural fibers, rubbers, resins, asphalts, ethylene propylene diene monomers, and admixtures thereof and can be applied in layers. The thermal coating optionally contains an isotropic polymer which includes, but is not limited to, acrylics, nylons, epoxies, silicones, polyesters, polyvinyl chlorides, polyethylenes, and chlorosulfonated polyethylenes. Alternatively, the thermal coating can be a ceramic or ceramic-based coating including materials selected from lanthanum, cerium, praseodymium, neodymium, promethium, samarium, europium, gadolinium, terbium, dysprosium, holmium, erbium, thulium, ytterbium, lutetium, indium, scandium, yttrium, zirconium, hafnium, titanium, silica, zirconia, magnesium zirconate, yttria-stabilized zirconia, and derivatives and admixtures thereof. An initial layer of the thermal coating can be cured to provide a pre-coat and the layers of the thermal coating can be cross-linked to provide high-strength adhesion to the anchor to resist chipping or wearing of the thermal coating.

The thermal coating reduces the K-value of the underlying metal components which include, but are not limited to, mill galvanized, hot galvanized, and stainless steel. Such components have K-values that range from 16 to 116 W/(m·K). The thermal coating reduces the K-value of the anchor to not exceed 1.0 W/(m·K). Likewise, the thermal anchor reduces the U-value of the cavity wall structure, such as a reduction by 5-80%. It is understood that other factors affect the U-value, such as the size of the cavity, the thickness of the insulation, the materials used, etc. The thermal coating is fire resistant and gives off no toxic smoke in the event of a fire. Furthermore, the coating is suited to the application in an anchoring system with characteristics such as shock resistance, non-frangibility, low thermal conductivity and transmissivity, and a non-porous resilient finish. Additionally, the thermal coating can provide corrosion protection which protects against deterioration of the anchoring system over time.

The thermal coating can be applied through any number of methods including fluidized bed production, thermal spraying, hot dip processing, heat-assisted fluid coating, or extrusion, and includes both powder and fluid coating to form a reasonably uniform coating. The coating preferably has a thickness selected to provide a thermal break in the cavity. In one embodiment, the thickness of the coating is at least about 3 microns, such as a thickness in the range of approximately 3 microns to approximately 300 microns. In one embodiment, a coating having a thickness of at least about 127 microns is applied to anchor 240. The thermal coating is cured to achieve good cross-linking of the layers. Appropriate examples of the nature of the coating and application process are set forth in U.S. Pat. Nos. 6,284,311 and 6,612,343.

Wall anchor 240 can also include a seal 282, which functions as seal 82 described above, to preclude air and moisture penetration and maintain the integrity of the insulation upon installation of the anchor. It will be understood that the seal system may be omitted or have a different configuration than described within the scope of the present invention.

Figure 21:
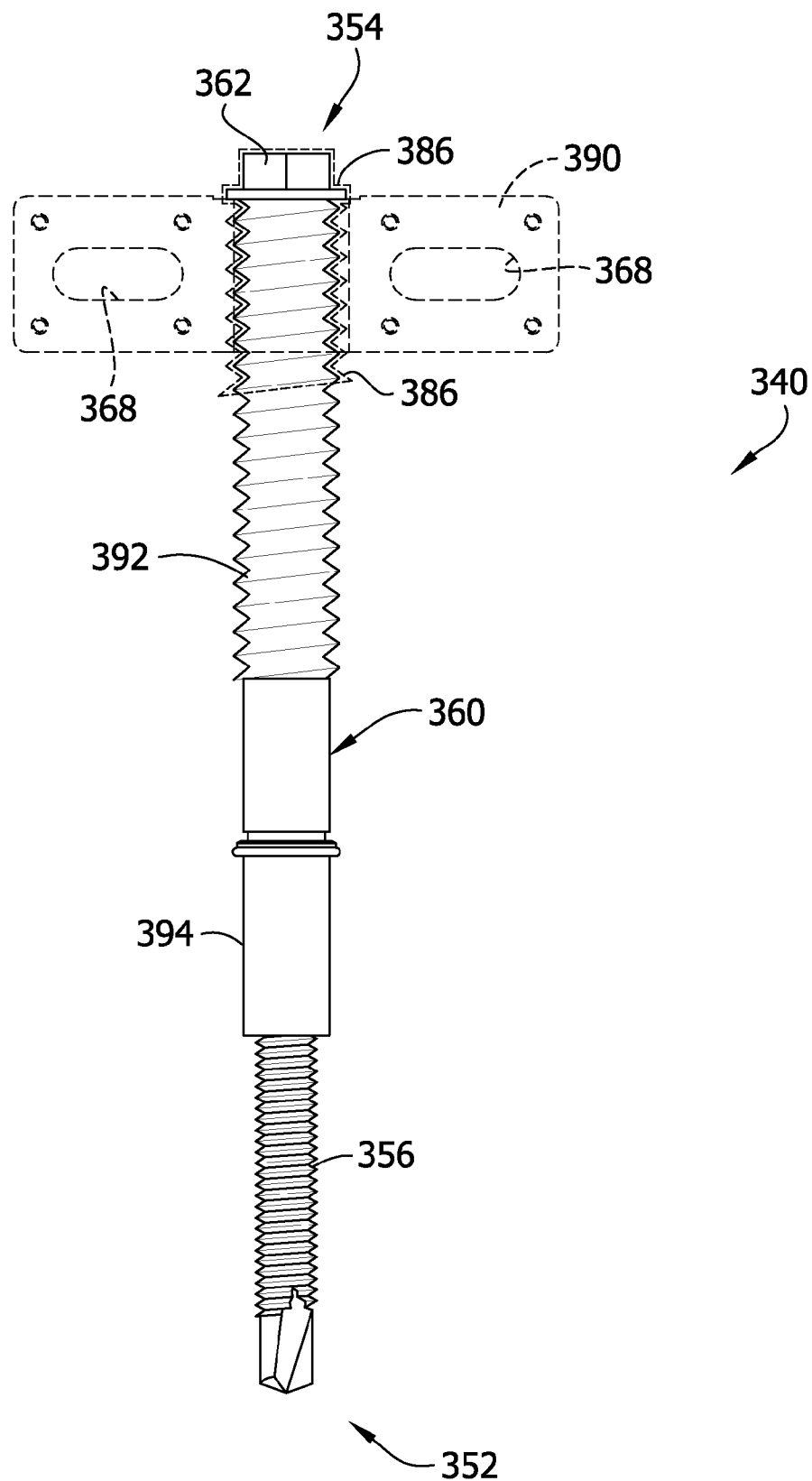
FIG. 21 is a front view of another embodiment of a thermal wall anchor.

Another embodiment of a wall anchor with thermal coating is illustrated in FIG. 21. Wall anchor 340 is similar to the wall anchors described above, with differences as pointed out herein.

Wall anchor 340 includes an elongate body that extends along the longitudinal axis 350 of the anchor from a driven end portion 352 to a driving end portion 354. The driven end portion 352 includes a screw or threaded portion 356 configured for attachment to a metal stud. The screw portion 356 can be stainless steel or other suitable metal, or can be a polymer coated metal screw. The screw portion 356 can include a thermal coating to reduce the thermal conductivity of the anchoring system. Wall anchor 340 includes a barrel 360 including a threaded barrel portion 392 and a non-threaded barrel portion 394 extending from the threaded portion to the screw portion 356. A drive head 362 (e.g., a hex head) is located at the driving end portion 354 of the anchor 340. Wall anchor 340 is used as described above with reference to wall anchor 40, but with a wing nut 390 as illustrated in phantom. The wing nut 390 is disposed on the elongate body adjacent the drive head 362. The wing nut 390 defines at least one receptor or aperture 368 for receiving a portion of a veneer tie, such as pintles of a veneer tie.

The wall anchor 340 includes a thermal coating 386 that is configured to provide a thermal break in the cavity. The main components of the wall anchor are preferably made of metal (e.g., steel) to provide a high-strength anchoring system. Through the use of a thermal coating, the underlying metal components of the anchor obtain a lower thermal conductive value (K-value), thereby providing a high strength anchor with the benefits of thermal isolation. Likewise, the entire cavity wall structure obtains a lower transmission value (U-value), thereby providing an anchoring system with the benefits of thermal isolation. All or a portion of the anchor 340 can include a thermal coating. In the illustrated embodiment, the anchor 340 includes a thermal coating 386 over the drive head 362 and part of the threaded barrel portion 392 (e.g., over at least ¾ inches of threads). Optionally, the anchor 340 can also include a thermal coating over the screw portion 356. In addition, the wing nut 390 can include a thermal coating, such as over the entire wing nut or at least on an interior surface of the wing nut defining the aperture 368 (i.e., the portion of the wall anchor 340 that contacts a veneer tie). As illustrated, portions of the anchor 340 can be uncoated. Alternatively, the entire wall anchor 340 can be coated. In one embodiment, the portion of the anchor 340 that is positioned at the juncture of the wall anchor and the stud and contacts the stud when installed includes a thermal coating to reduce thermal transmission from the metal stud. The thermal coating is selected from thermoplastics, thermosets, natural fibers, rubbers, resins, asphalts, ethylene propylene diene monomers, and admixtures thereof and can be applied in layers. The thermal coating optionally contains an isotropic polymer which includes, but is not limited to, acrylics, nylons, epoxies, silicones, polyesters, polyvinyl chlorides, polyethylenes, and chlorosulfonated polyethylenes. Alternatively, the thermal coating can be a ceramic or ceramic-based coating including materials selected from lanthanum, cerium, praseodymium, neodymium, promethium, samarium, europium, gadolinium, terbium, dysprosium, holmium, erbium, thulium, ytterbium, lutetium, indium, scandium, yttrium, zirconium, hafnium, titanium, silica, zirconia, magnesium zirconate, yttria-stabilized zirconia, and derivatives and admixtures thereof. An initial layer of the thermal coating can be cured to provide a pre-coat and the layers of the thermal coating can be cross-linked to provide high-strength adhesion to the anchor to resist chipping or wearing of the thermal coating.

The thermal coating reduces the K-value of the underlying metal components which include, but are not limited to, mill galvanized, hot galvanized, and stainless steel. Such components have K-values that range from 16 to 116 W/(m·K). The thermal coating reduces the K-value of the anchor to not exceed 1.0 W/(m·K). Likewise, the thermal anchor reduces the U-value of the cavity wall structure, such as a reduction by 5-80%. It is understood that other factors affect the U-value, such as the size of the cavity, the thickness of the insulation, the materials used, etc. The thermal coating is fire resistant and gives off no toxic smoke in the event of a fire. Furthermore, the coating is suited to the application in an anchoring system with characteristics such as shock resistance, non-frangibility, low thermal conductivity and transmissivity, and a non-porous resilient finish. Additionally, the thermal coating can provide corrosion protection which protects against deterioration of the anchoring system over time.

The thermal coating can be applied through any number of methods including fluidized bed production, thermal spraying, hot dip processing, heat-assisted fluid coating, or extrusion, and includes both powder and fluid coating to form a reasonably uniform coating. The coating preferably has a thickness selected to provide a thermal break in the cavity. In one embodiment, the thickness of the coating is at least about 3 microns, such as a thickness in the range of approximately 3 microns to approximately 300 microns. In one embodiment, a coating having a thickness of at least about 127 microns is applied to anchor 340. The thermal coating is cured to achieve good cross-linking of the layers. Appropriate examples of the nature of the coating and application process are set forth in U.S. Pat. Nos. 6,284,311 and 6,612,343.

Wall anchor 340 can also include seals as described above, to preclude air and moisture penetration and maintain the integrity of the insulation upon installation of the anchor. It will be understood that the seal system may be omitted or have a different configuration than described within the scope of the present invention.

Figure 22:
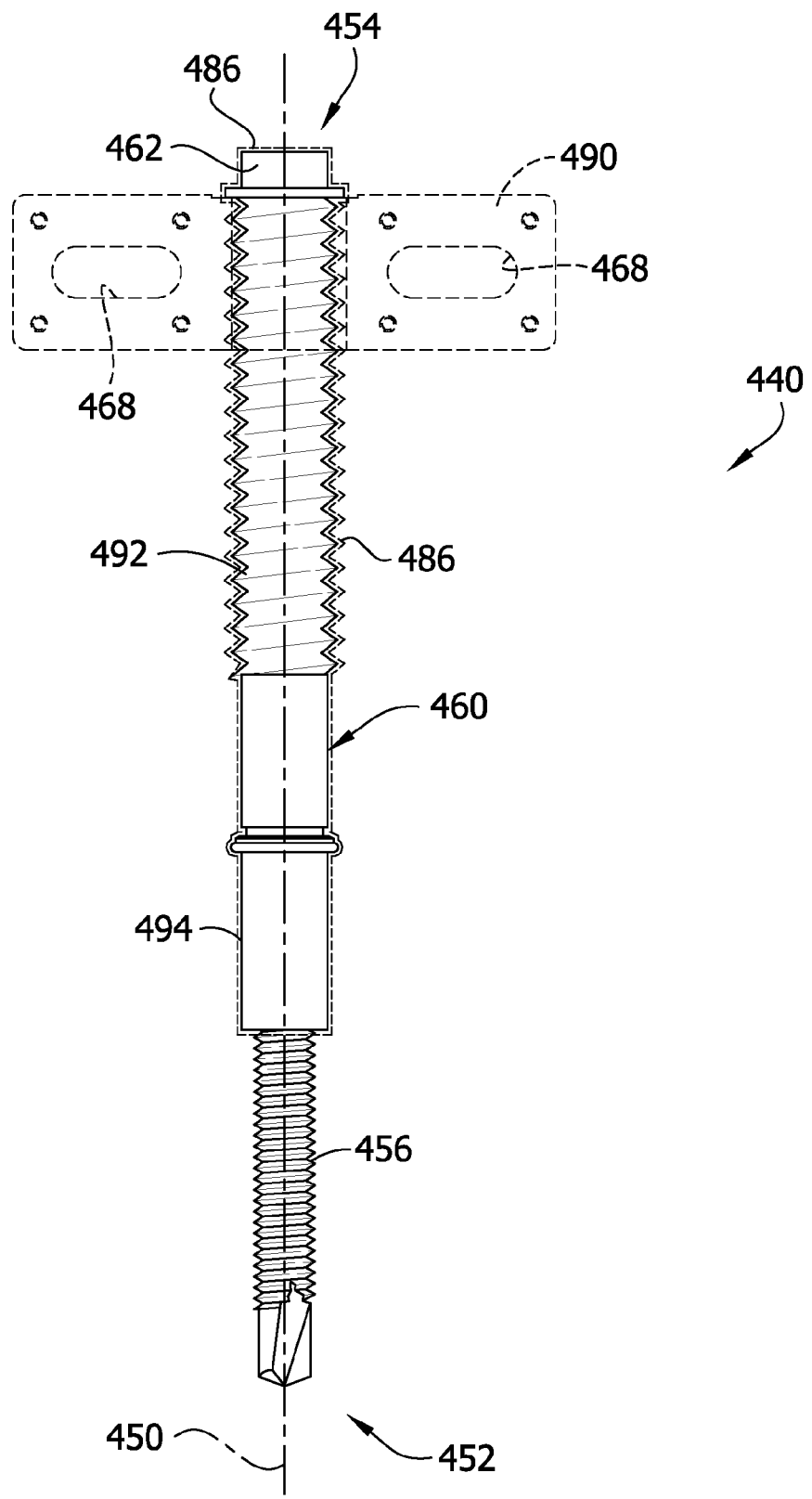
FIG. 22 is a front view of another embodiment of a thermal wall anchor.

Another embodiment of a wall anchor with thermal coating is illustrated in FIG. 22. Wall anchor 440 is similar to the wall anchors described above, with differences as pointed out herein.

Wall anchor 440 includes an elongate body that extends along the longitudinal axis 450 of the anchor from a driven end portion 452 to a driving end portion 454. The driven end portion 452 includes a screw or threaded portion 456 configured for attachment to a metal stud. The screw portion 456 can be stainless steel or other suitable metal, or can be a polymer coated metal screw. The screw portion 456 can include a thermal coating to reduce the thermal conductivity of the anchoring system. Wall anchor 440 includes a barrel 460 including a threaded barrel portion 492 and a non-threaded barrel portion 494 a non-threaded barrel portion 494 extending from the threaded portion to the screw portion 456. A drive head 462 (e.g., a hex head) is located at the driving end portion 454 of the anchor 440. Wall anchor 440 is used as described above with reference to wall anchor 40, but with a wing nut 490 as illustrated in phantom. The wing nut 490 is disposed on the elongate body adjacent the drive head 462. The wing nut 490 defines at least one receptor or aperture 468 for receiving a portion of a veneer tie, such as pintles of a veneer tie.

The wall anchor 440 includes a thermal coating 486 that is configured to provide a thermal break in the cavity. The main components of the wall anchor are preferably made of metal (e.g., steel) to provide a high-strength anchoring system. Through the use of a thermal coating, the underlying metal components of the anchor obtain a lower thermal conductive value (K-value), thereby providing a high strength anchor with the benefits of thermal isolation. Likewise, the entire cavity wall structure obtains a lower transmission value (U-value), thereby providing an anchoring system with the benefits of thermal isolation. All or a portion of the anchor 440 can include a thermal coating. In the illustrated embodiment, the anchor 440 includes a thermal coating 486 over the drive head 462, the threaded barrel portion 492, and the non-threaded barrel portion 494. Optionally, the anchor 440 can also include a thermal coating over the screw portion 456. In addition, the wing nut 490 can include a thermal coating, such as over the entire wing nut or at least on an interior surface of the wing nut defining the aperture 468 (i.e., the portion of the wall anchor 440 that contacts a veneer tie. As illustrated, portions of the anchor 440 can be uncoated. Alternatively, the entire wall anchor 440 can be coated. In one embodiment, the portion of the anchor 440 that is positioned at the juncture of the wall anchor and the stud and contacts the stud when installed includes a thermal coating to reduce thermal transmission from the metal stud. The thermal coating is selected from thermoplastics, thermosets, natural fibers, rubbers, resins, asphalts, ethylene propylene diene monomers, and admixtures thereof and can be applied in layers. The thermal coating optionally contains an isotropic polymer which includes, but is not limited to, acrylics, nylons, epoxies, silicones, polyesters, polyvinyl chlorides, polyethylenes, and chlorosulfonated polyethylenes. Alternatively, the thermal coating can be a ceramic or ceramic-based coating including materials selected from lanthanum, cerium, praseodymium, neodymium, promethium, samarium, europium, gadolinium, terbium, dysprosium, holmium, erbium, thulium, ytterbium, lutetium, indium, scandium, yttrium, zirconium, hafnium, titanium, silica, zirconia, magnesium zirconate, yttria-stabilized zirconia, and derivatives and admixtures thereof. An initial layer of the thermal coating can be cured to provide a pre-coat and the layers of the thermal coating can be cross-linked to provide high-strength adhesion to the anchor to resist chipping or wearing of the thermal coating.

The thermal coating reduces the K-value of the underlying metal components which include, but are not limited to, mill galvanized, hot galvanized, and stainless steel. Such components have K-values that range from 16 to 116 W/(m·K). The thermal coating reduces the K-value of the anchor to not exceed 1.0 W/(m·K). Likewise, the thermal anchor reduces the U-value of the cavity wall structure, such as a reduction by 5-80%. It is understood that other factors affect the U-value, such as the size of the cavity, the thickness of the insulation, the materials used, etc. The thermal coating is fire resistant and gives off no toxic smoke in the event of a fire. Furthermore, the coating is suited to the application in an anchoring system with characteristics such as shock resistance, non-frangibility, low thermal conductivity and transmissivity, and a non-porous resilient finish. Additionally, the thermal coating can provide corrosion protection which protects against deterioration of the anchoring system over time.

The thermal coating can be applied through any number of methods including fluidized bed production, thermal spraying, hot dip processing, heat-assisted fluid coating, or extrusion, and includes both powder and fluid coating to form a reasonably uniform coating. The coating preferably has a thickness selected to provide a thermal break in the cavity. In one embodiment, the thickness of the coating is at least about 3 microns, such as a thickness in the range of approximately 3 microns to approximately 300 microns. In one embodiment, a coating having a thickness of at least about 127 microns is applied to anchor 440. The thermal coating is cured to achieve good cross-linking of the layers.

Appropriate examples of the nature of the coating and application process are set forth in U.S. Pat. Nos. 6,284,311 and 6,612,343.

Wall anchor 440 can also include seals as described above, to preclude air and moisture penetration and maintain the integrity of the insulation upon installation of the anchor. It will be understood that the seal system may be omitted or have a different configuration than described within the scope of the present invention.

The anchors as described above serve to thermally isolate the components of the anchoring system, thereby reducing the thermal transmission and conductivity values of the anchoring system as a whole. The anchors provide an insulating effect and an in-cavity thermal break, severing the thermal pathways created from metal-to-metal contact of anchoring system components. Through the use of the thermally-isolating anchors, the underlying metal components obtain a lower thermal conductive value (K-value), thereby reducing the thermal transmission value (U-value) of the entire cavity wall structure. The present invention maintains the strength of the metal and further provides the benefits of a thermal break in the cavity.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A wall anchor for use in a cavity wall to connect to a veneer tie to join an inner wythe and an outer wythe of the cavity wall, the wall anchor comprising:
   an elongate body having a driven end portion and a driving end portion, the driven end portion being adapted to be threadedly mounted on the inner wythe of the cavity wall, the elongate body including a barrel portion adjacent the driven end portion, a first end of the barrel portion being adapted to abut the inner wythe of the cavity wall when installed; and
   a thermal coating disposed on the driven end portion and the first end of the barrel portion, the thermal coating being configured and arranged to reduce thermal transfer in the cavity wall between the elongate body and the inner wythe when installed.

2. The wall anchor of claim 1, wherein the first end of the barrel portion comprises an end surface of the barrel portion, the thermal coating being disposed on the end surface such that the thermal coating is positioned between the end surface and the inner wythe of the cavity when installed.

3. The wall anchor of claim 1, wherein the driven end portion comprises a threaded portion, the thermal coating being disposed on the threaded portion.

4. The wall anchor of claim 1, wherein the thermal coating is disposed on the entire elongate body.

5. The wall anchor of claim 1, wherein the driving end portion includes a drive head having an interior surface defining a receptor for receiving a portion of a veneer tie, the thermal coating being disposed on the interior surface of the receptor such that the thermal coating extends into the receptor to coat the interior surface defining the receptor.

6. The wall anchor of claim 1, wherein the barrel portion is a first barrel portion, the elongate body further comprising a second barrel portion adjacent the first barrel portion and having a diameter larger than a diameter of the first barrel portion, the thermal coating being disposed on both the first and second barrel portions.

7. The wall anchor of claim 1, wherein the driving end portion comprises a drive head and the driven end portion comprises a threaded portion.

8. The wall anchor of claim 7, further comprising an external seal disposed on the elongate body at a junction of the drive head and the barrel portion, the external seal being configured to seal a channel formed by insertion of the wall anchor into a wall, precluding water and vapor penetration therethrough.

9. The wall anchor of claim 7, further comprising an internal seal disposed on the elongate body at a junction of the threaded portion and the barrel portion, the internal seal being configured to seal a channel formed by insertion of the wall anchor into a wall, precluding water and vapor penetration therethrough.

10. The wall anchor of claim 1, wherein the thermal coating is selected from the group consisting of thermoplastics, thermosets, natural fibers, rubber, resins, asphalts, ethylene propylene diene monomers, acrylics, nylons, epoxies, silicones, polyesters, polyvinyl chlorides, polyethylenes, chlorosulfonated polyethylenes, lanthanum, cerium, praseodymium, neodymium, promethium, samarium, europium, gadolinium, terbium, dysprosium, holmium, erbium, thulium, ytterbium, lutetium, indium, scandium, yttrium, zirconium, hafnium, titanium, silica, zirconia, magnesium zirconate, yttria-stabilized zirconia, and derivatives and admixtures thereof.

11. The wall anchor of claim 1, wherein the thermal coating has a thickness of at least 3 microns.

12. A wall anchor for use in a cavity wall to connect to a veneer tie to join an inner wythe and an outer wythe of the cavity wall, the wall anchor comprising:
   an elongate body having a driven end portion and a driving end portion, the driven end portion being adapted to be threadedly mounted on the inner wythe of the cavity wall, the elongate body including a barrel portion adjacent the driven end portion, a first end of the barrel portion being adapted to abut the inner wythe of the cavity wall when installed; and
   a thermal coating disposed on the first end of the barrel portion, the thermal coating being configured and arranged to reduce thermal transfer in the cavity wall between the elongate body and the inner wythe when installed.

13. The wall anchor of claim 12, wherein the first end of the barrel portion comprises an end surface, the thermal coating being disposed on the end surface such that the thermal coating is positioned between the end surface and the inner wythe of the cavity when installed.

14. The wall anchor of claim 12, wherein the driven end portion comprises a threaded portion, the threaded portion being free from thermal coating.

15. The wall anchor of claim 12, wherein the thermal coating is disposed on the entire elongate body.

16. The wall anchor of claim 12, wherein the driving end portion includes a drive head having an interior surface defining a receptor for receiving a portion of a veneer tie, the thermal coating being disposed on the interior surface of the receptor such that the thermal coating extends into the receptor to coat the interior surface defining the receptor.

17. The wall anchor of claim 12, wherein the barrel portion is a first barrel portion, the elongate body further comprising a second barrel portion adjacent the first barrel portion and having a diameter larger than a diameter of the first barrel portion, the thermal coating being disposed on both the first and second barrel portions.

18. The wall anchor of claim 12, wherein the driving end portion comprises a drive head and the driven end portion comprises a threaded portion, the wall anchor further comprising:
- an external seal disposed on the elongate body at a junction of the drive head and the barrel portion, the external seal being configured to seal a channel formed by insertion of the wall anchor into a wall, precluding water and vapor penetration therethrough; and
- an internal seal disposed on the elongate body at a junction of the threaded portion and the barrel portion, the internal seal being configured to seal a channel formed by insertion of the wall anchor into a wall, precluding water and vapor penetration therethrough.

19. The wall anchor of claim 12, wherein the thermal coating is selected from the group consisting of thermoplastics, thermosets, natural fibers, rubber, resins, asphalts, ethylene propylene diene monomers, acrylics, nylons, epoxies, silicones, polyesters, polyvinyl chlorides, polyethylenes, chlorosulfonated polyethylenes, lanthanum, cerium, praseodymium, neodymium, promethium, samarium, europium, gadolinium, terbium, dysprosium, holmium, erbium, thulium, ytterbium, lutetium, indium, scandium, yttrium, zirconium, hafnium, titanium, silica, zirconia, magnesium zirconate, yttria-stabilized zirconia, and derivatives and admixtures thereof.

20. The wall anchor of claim 12, wherein the thermal coating has a thickness of at least 3 microns.

\* \* \* \* \*